US011408731B2

(12) United States Patent
Flood et al.

(10) Patent No.: US 11,408,731 B2
(45) Date of Patent: Aug. 9, 2022

(54) CONTROLLING A MACHINE BASED ON DETECTED MACHINE WORK CYCLES

(71) Applicant: Deere & Company, Moline, IL (US)

(72) Inventors: Matthew J. Flood, Dubuque, IA (US); Alek D. Jerauld, Dubuque, IA (US); Thomas A. Knopp, Dubuque, IA (US); Robert A. Hamilton, Dubuque, IA (US); William K. Borrenpohl, Dubuque, IA (US)

(73) Assignee: Deere & Company, Moline, IL (US)

( * ) Notice: Subject to any disclaimer, the term of this patent is extended or adjusted under 35 U.S.C. 154(b) by 981 days.

(21) Appl. No.: 15/966,672

(22) Filed: Apr. 30, 2018

(65) Prior Publication Data

US 2019/0331481 A1  Oct. 31, 2019

(51) Int. Cl.
*G01B 11/26* (2006.01)
*G07C 5/08* (2006.01)
*G01P 13/02* (2006.01)
*G06F 3/04817* (2022.01)
*G06F 3/0481* (2022.01)

(52) U.S. Cl.
CPC .............. *G01B 11/26* (2013.01); *G01P 13/02* (2013.01); *G06F 3/04817* (2013.01); *G07C 5/0808* (2013.01)

(58) Field of Classification Search
CPC ...... G01B 11/26; G01B 21/22; G06F 3/04817; G01P 13/02; G01P 13/04
USPC ........................................................ 702/182
See application file for complete search history.

(56) References Cited

U.S. PATENT DOCUMENTS

| 2009/0299707 | A1 | 12/2009 | Putkonen |
| 2012/0323453 | A1 | 12/2012 | Havimaki et al. |
| 2013/0066527 | A1* | 3/2013 | Mizuochi ............ B66C 23/905 701/50 |
| 2014/0107895 | A1* | 4/2014 | Faivre .................. E02F 9/264 701/50 |

* cited by examiner

*Primary Examiner* — Michael P Nghiem
*Assistant Examiner* — Dacthang P Ngo
(74) *Attorney, Agent, or Firm* — Joseph R. Kelly; Kelly, Holt & Christenson PLLC

(57) ABSTRACT

A work cycle detection and control system includes an angle detector that detects an angular position of an implement, operably coupled to a mobile machine, relative to a base of the mobile machine. The system also includes a range detector that detects a degree range of rotation, about the base, in which the angular position of the implement is located. Work cycle logic identifies a particular work cycle, from a plurality of different work cycles, that the mobile machine is performing, based on the degree range. An action signal generator generates an action signal, based on the particular work cycle.

18 Claims, 14 Drawing Sheets

CONTROLLING A MACHINE BASED ON DETECTED MACHINE WORK CYCLES

FIELD OF THE DESCRIPTION

The present description generally relates to the use of equipment in forestry operations. More specifically, the present description relates to the use of systems in improving detection of machine activity for control applications at a forestry worksite.

BACKGROUND

There are a wide variety of different types of equipment, such as forestry equipment, construction equipment, and agricultural equipment. These types of equipment are often operated by an operator and have sensors that generate information during an operation. These types of equipment can often communicate the sensor information to other machines.

Forestry equipment can include a wide variety of machines such as harvesters, skidders, feller bunchers, forwarders, and swing machines, among others. Forestry equipment can be operated by an operator and have many different mechanisms that are controlled by the operator.

The equipment may have multiple different mechanical, electrical, hydraulic, pneumatic, electromechanical (and other) subsystems, some or all of which can be controlled, at least to some extent, by the operator. Some or all of these subsystems may communicate information that is obtained from sensors on the machine (and from other inputs).

Current systems may experience difficulty in using sensed information to characterize activity of the machine itself. That is, current systems may experience difficulty detecting certain activities that a machine performs to better control an overall performance of the machine at the worksite.

The discussion above is merely provided for general background information and is not intended to be used as an aid in determining the scope of the claimed subject matter.

SUMMARY

A work cycle detection and control system includes an angle detector that detects an angular position of an implement, operably coupled to a mobile machine, relative to a base of the mobile machine. The system also includes a range detector that detects a degree range of rotation, about the base, in which the angular position of the implement is located. Work cycle logic identifies a particular work cycle, from a plurality of different work cycles, that the mobile machine is performing, based on the degree range. An action signal generator generates an action signal, based on the particular work cycle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A wide variety of different forestry operations can be performed at a jobsite. Some example forestry operations include harvesting a planted material, cutting the stems of the harvested material, removing the branches from the harvested material, sorting the harvested material into piles, and loading the piles onto a hauling truck. Many such forestry operations utilize machinery that can perform a variety of functions.

Forestry machines (also referred to herein as a machine, a mobile machine, and a vehicle) often have a wide variety of sensors that sense a variety of different variables such as machine operating parameters, worksite characteristics, environmental parameters, etc. Sensor signals are communicated over a controller area network (CAN) bus (or another network, such as an Ethernet network, WiFi etc.) to various systems on the machine that process the sensed variables to generate output signals (such as control signals or other outputs) based on the sensed variables.

These sensor signals are communicated to provide measurements and other information, such as a length of a stem that is being processed. While a measured length of a stem might be valuable information, itself, there is generally a lack of understanding of how to associate this information to specific types of operations that a machine performs. For example, it might be difficult to determine a volume of material processed by the machine at each respective cycle in a machine operation. In some current systems, it is difficult to track high resolution data on a cycle-by-cycle basis, at least partly because a single machine can perform a wide variety of different activities. Each activity performed by the machine might represent work being done in one or more cycles of operation, and each cycle can be characterized by a particular type of processing done on a set of material (e.g., cutting trees, sorting piles, etc.). To add to the difficulty, the machine controls a wide variety of different subsystems, implements, attachments, engine variables, and other characteristics or functions of the machine, in a wide variety of different ways that may or may not be specific to the particular type of activity being performed in a given cycle. To address at least some of these difficulties, the present description provides a work cycle detection and control system that tracks machine activity on a per-cycle basis.

Figure 1:
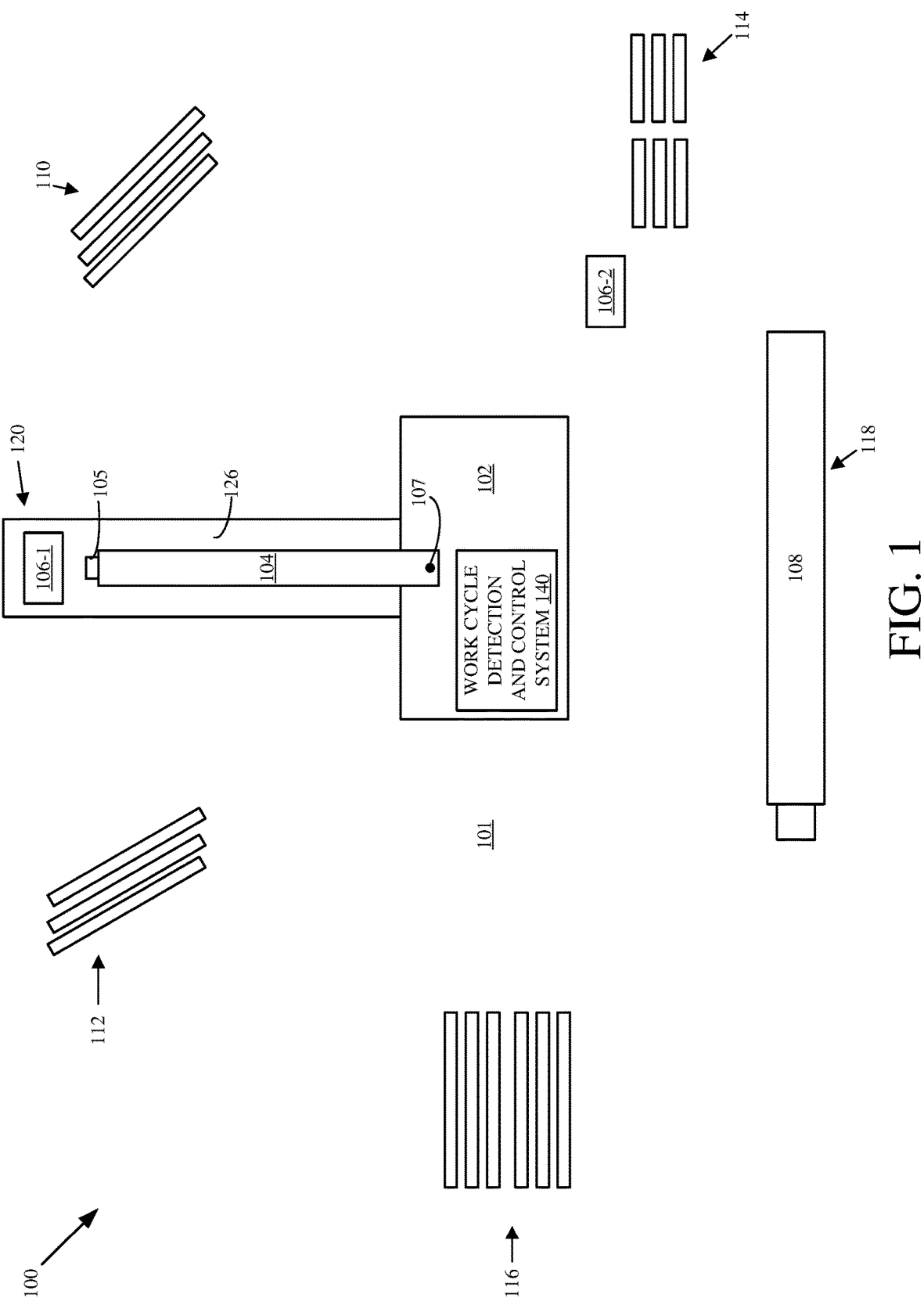
FIG. 1 is a pictorial illustration of an architecture having a mobile machine using a work cycle detection and control system.

FIG. 1 is a pictorial illustration of an architecture 100 having a mobile machine 102 using a work cycle detection and control system 140 at a jobsite 101. Mobile machine 102 is configured to perform a wide variety of different operations at jobsite 101. In the example illustrated in FIG. 1, mobile machine 102 is a knuckleboom loader in a forestry operation.

Mobile machine 102 pivots or swings an implement 104 relative to a base 126, about axis 107, to perform different operations at different angular positions. That is, mobile machine 102 swings implement 104 to various angular positions that enable machine 102 to operate on material located at or near areas 110-118. For example, but not by limitation, mobile machine 102 positions implement 104 at or near any or all of: area 110 to perform a raw material sorting operation; area 112 to perform a delimbing operation; area 114 to perform a topping and/or cut-to-length operation; area 116 to perform a post-process sorting operation; area 118 to perform a loading operation (e.g., to load processed trees onto hauling truck 108), and area 120 to idle or wait to perform an operation.

In one example, implement 104 is a boom or a swing arm (which may have multiple controllable linkages) that supports a grapple 105. Using grapple 105, boom 104 can move logs to controllable attachments 106-1 and 106-2 for operations. In the illustrated example, controllable attachment 106-1 includes delimbing knives, and controllable attachment 106-2 includes a saw (although in other examples the saw may be positioned near the delimber as well). As such, mobile machine 102 illustratively rotates boom 104 to an angular position near area 112 to pick up one or more trees with grapple 105 and move them through delimbing knives 106-1 to perform a delimbing operation on the tree(s) in grapple 105. Mobile machine 102 can also rotate boom 104 to an angular position near area 114, and control saw 106-2 to perform a topping or cut-to length operation on logs in grapple 105.

Work cycle detection and control system 140 can be used to generate a wide variety of different information pertaining to machine performance for each of the different operations. In controlling machine 102, it might be useful to understand a measure of material processed by mobile machine 102 and/or an amount of time that mobile machine 102 is spending on each of the different operations (or work cycles) illustrated in FIG. 1. This type of information can also be used by work cycle detection and control system 140 to understand and compare performance across a group of machines as well. For example, it might be beneficial to understand that a first machine delimbs trees at a rate of 20 tons/hour, and a second machine delimbs trees at a rate of 18 tons/hour, so that control adjustments can be made.

In order to obtain this information, the operator first controls mobile machine 102 to identify where the different work cycles will be performed. For example, the operator can actuate a first user input mechanism to move boom 104 to a first angular position about axis of rotation 107. While boom 104 is positioned at the first angular position, the operator actuates a second user input mechanism to define a first limit of a degree range. The operator then actuates the first user input mechanism to move boom 104 to a second angular position about axis of rotation 107. While boom 104 is positioned at the second angular position, the operator actuates the second user input mechanism to define a second limit of the degree range. The operator can also provide an input that selects a work cycle to be associated with the degree range that was just defined. For example, the operator may actuate a user input mechanism to define the degree range as an area in which boom 104 is positioned while performing a delimbing operation. This calibration process can be repeated for each type of cycle that mobile machine 102 performs (e.g., topping, sorting, loading, etc.). Then, during an operation, work cycle detection and control system 140 uses sensor information from mobile machine 102 to automatically detect when boom 104 is positioned within one of the degree ranges defined for the various cycles. It can use this information to determine which operation mobile machine 102 is performing. It can then aggregate performance data for the identified cycles and generate control signals based on the performance data.

Figure 2:
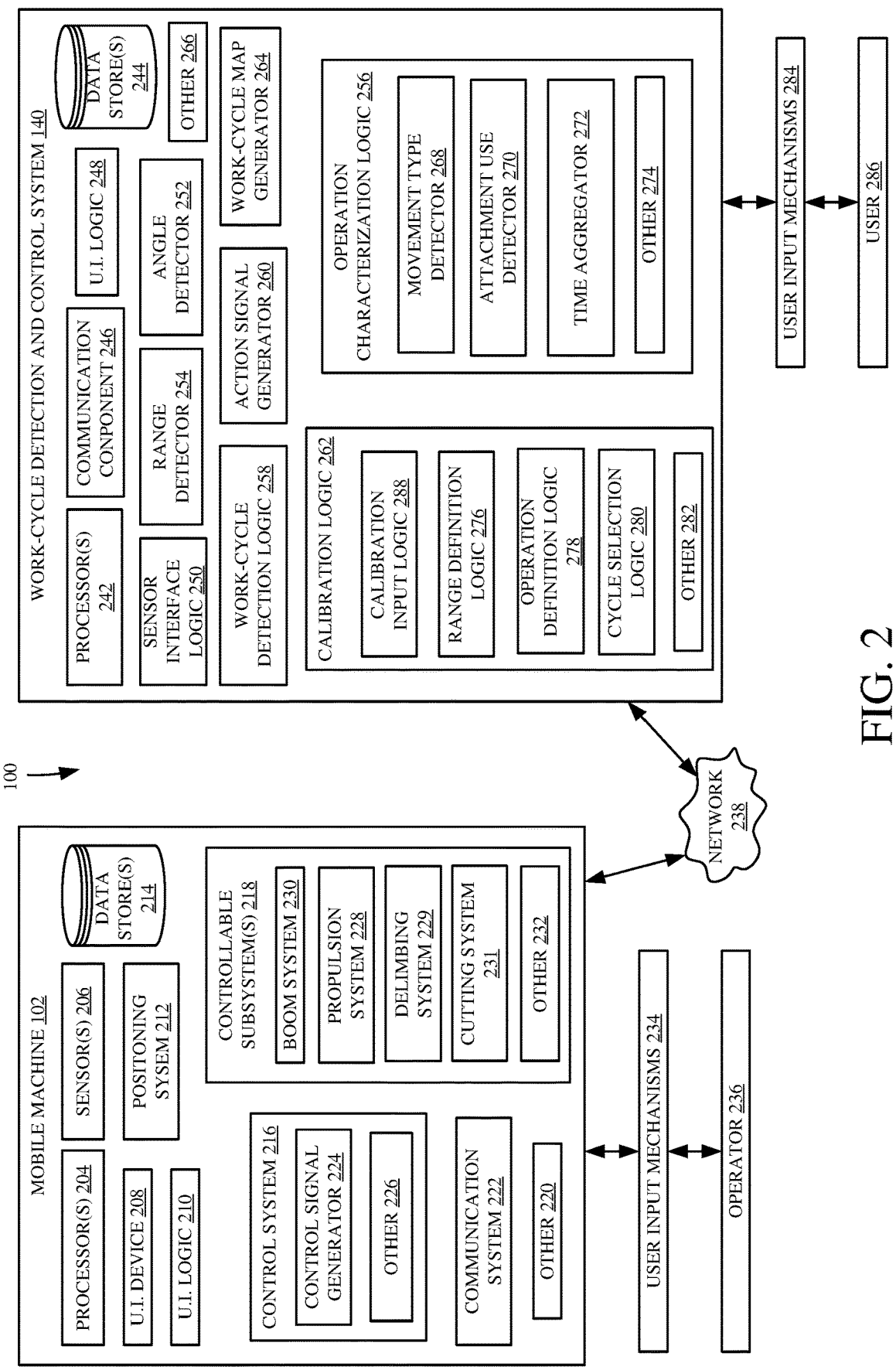
FIG. 2 is a block diagram of one example of a computing architecture that includes the work cycle detection and control system illustrated in FIG. 1.

FIG. 2 is a block diagram of one example of a computing architecture 100 that includes mobile machine 102 and work cycle detection and control system 140 illustrated in FIG. 1. Prior to describing work cycle detection and control system 140 in detail, an overview of computing architecture 100 and mobile machine 102 is first provided.

FIG. 2 illustratively shows that work cycle detection and control system 140 and mobile machine 102 are connected over network 238. Thus, computing architecture 100 operates in a networked environment, where network 238 includes any of a wide variety of different logical connections such as a local area network (LAN), wide area network (WAN), controller area network (CAN) near field communication network, satellite communication network, cellular networks, or a wide variety of other networks or combination of networks. It is also noted that work cycle detection and control system 140 can be deployed on mobile machine 102 such that the system performs the operations described herein without a networked connection.

While the present description will primarily focus on an example in which mobile machine 102 includes a forestry machine (such as a knuckleboom loader) that performs forestry operations, it is noted that mobile machine 102 can include any of a wide variety of different machines. In addition, while the present description will primarily focus on an example of work cycle detection and control system 140 communicating with mobile machine 102, it is noted that the same or similar functionality can be provided when communicating with a wide variety of other mobile machines and/or remote systems.

FIG. 2 illustratively shows that mobile machine 102 includes one or more processor(s) 204, one or more sensor(s) 206, a user interface device 208, user interface logic 210, a positioning system 212, one or more data store(s) 214, a control system 216, controllable subsystems 218, and other mobile machine components 220.

In one example, mobile machine 102 uses user interface logic 210 to generate operator interface displays having user input mechanisms 234 for display on user interface device 208 and for interaction by operator 236. Operator 236 can be a local operator of mobile machine 102 in an operator's compartment of mobile machine 102, and can interact with user input mechanisms 234 to control and manipulate mobile machine 102. Operator 236 can also be a remote operator of mobile machine 102, interacting with mobile machine 102, for example, via a communication device over network 238. User input mechanisms 234 can include one or more display devices (e.g., user interface device 208), one or more audio devices, one or more haptic devices, and other items, such as a steering wheel, joysticks, pedals, levers, buttons, keypads, etc.

Sensor(s) 206 can generate a wide variety of different sensor signals representing a wide variety of different sensed variables. For instance, sensor(s) 206 can generate signals indicative of an angular position of boom 104 relative to base 126, about axis 107. Sensor(s) 206 can also be optical sensors, load sensors, accelerometers, potentiometers, hall effect sensors, or other sensors that generate sensor signals indicative of, for example, stem length, stem diameter, stem weight, load weight, acceleration, hydraulic actuator movement or position, a geographic location (e.g., where sensors 206 include a global positioning system (GPS) receiver or other positioning system 212), among others. Sensor(s) 206 can also include imaging sensors, such as video cameras, laser based sensors, LIDAR based sensors, radar, and a wide variety of other imaging or other sensing systems.

Positioning system 212 illustratively generates one or more signals indicative of a position of mobile machine 102 at any given time during an operation. Generally, positioning system 212 receives sensor signals from one or more sensor(s) 206, such as a GPS receiver, a dead reckoning system, a LORAN system, or a wide variety of other systems or sensors, to determine a position of mobile machine 102 across jobsite 101. Positioning system 212 can also access data store 214 to retrieve stored positioning information that indicates positions of mobile machine 102 in performing historical operations, as well as the paths and/or patterns of travel of mobile machine 102 during performance of the historical operations.

Communication system 222 is generally configured to allow mobile machine 102 to communicate with remote systems including other mobile machines, work cycle detection and control system 140, among others. Thus, communication system 222 illustratively communicates over networks discussed above. It also illustratively allows portions of mobile machine 102 to communicate with one another, such as over a controller area network (CAN) bus.

Control system 216 also includes a control signal generator 224 that generates control signals for controlling a wide variety of different controllable subsystems 218 based on sensor signals generated by sensor(s) 206, based on information received through communication system 222 (e.g., information received from work cycle detection and control system 140), based on user inputs received through user input mechanisms 234 detected via user interface logic 210, based on positioning information obtained from positioning system 212, and/or it can generate control signals in a wide variety of other ways as well. Control system 216 can include other control system components 226 as well.

Controllable subsystems 218 illustratively include a propulsion system 228, a boom system 230, a delimbing system 229, a cutting system 231, among a wide variety of other controllable subsystems 232. Propulsion system 228 generally includes an engine that drives ground engaging wheels or tracks via a powertrain mechanism. Boom system 230 is configured to control movement and positioning of boom 104 (e.g., using hydraulic or pneumatic actuators, etc.). Delimbing system 229 includes one or more knives that engage a log to strip the log of its branches. Cutting system 231 can include one or more saws or cutting blades that cut logs to various different lengths. It is noted that delimbing system 229 and cutting system 231 can be positioned on mobile machine 102, but in another example, delimbing system 229 and cutting system 231 are positioned at a location that is remote from mobile machine 102, and are thereby configured to communicate with mobile machine 102 over the networks discussed above. As such, mobile machine 102 can actuate controllably coupled attachments when the attachments are positioned at jobsite 101. As shown in FIG. 1, for example, delimbing system 229 can be positioned at the location indicated by controllable attachment 106-1, and cutting system 231 can be positioned at the location indicated by controllable attachment 106-2. These are example locations only.

Work cycle detection and control system 140 illustratively includes one or more processor(s) 242, one or more data store(s) 244, a communication component 246, user interface logic 248, sensor interface logic 250, an angle detector 252, a range detector 254, operation characterization logic 256, work cycle detection logic 258, an action signal generator 260, calibration logic 262, and a work cycle map generator 264. It can also include a wide variety of other work cycle detection and control components 266.

Communication component 246 is generally configured to facilitate communication between work cycle detection and control system 140 and a wide variety of remote systems including mobile machine 102, among others. Thus, communication component 246 illustratively communicates over networks discussed above.

In one example, work cycle detection and control system 140 uses user interface logic 248 to generate interface displays having user input mechanisms 284 for display on a user interface device for interaction by user 286. Work cycle detection and control system 140 can also or alternatively use user interface logic 248 to generate interface displays having user input mechanisms 284 for display on user interface device 208, and for interaction by operator 236. As such, information generated by work cycle detection and control system 140 can be provided as performance and control data to both a manager (e.g., user 286) of jobsite 101 and to a machine operator (e.g., operator 236). User interface logic 248 also detects user inputs through, or interaction with, user input mechanisms 284, which can take a wide variety of different forms, some of which are described below. User interface logic 248 can send an indication of the detected user interaction to other items in work cycle detection and control system 140, to mobile machine 102, or elsewhere.

Sensor interface logic 250 obtains sensor signals from a wide variety of different sensors on a wide variety of different mobile machines. Sensor interface logic 250 uses indications of the sensed signals to generate a set of sensor information that identifies the variables sensed by sensor(s) 206 on mobile machine 102. In the example illustrated in FIG. 2, sensor interface logic 250 obtains sensor signals from sensor(s) 206, such as an angle sensor that senses an angle of rotation of boom 104 about axis 107. Sensor information generated by sensor interface logic 250 can therefore include an indication of a sensed rotational position of boom 104. Sensor interface logic 250 can also generate sensor information indicating, for example, material characteristics (such as size, weight, length, volume of logs, etc.), engine speed or other engine characteristics or variables sensed on mobile machine 102, or the utilization of a machine implement (e.g., a saw, knife, grapple), among other things.

Angle detector 252 generally detects an angular position of boom 104 based on a sensor input. Angle detector 252 receives an indication of a sensed position of boom 104 from the sensor information obtained by sensor interface logic 250. Based on the sensor information, angle detector 252 generates a signal indicative of a detected angular position of boom 104 about axis of rotation 107. In the example described above, where boom 104 rotates about axis 107, relative to base 126 (e.g., as described with respect to FIG.

1), angle detector 252 detects the angular rotation of boom about axis of rotation 107, and relative to fixed base 126. It is also noted that angle detector 252 can detect a direction of rotation of boom 104. That is, for example, a neutral or zero position can be that position shown in FIG. 1. Rotation of boom 104 in a clockwise direction may be indicated by a positive angular position (e.g., 1 degree to 179 degrees from the neutral or zero position), while rotation of boom 104 in a counter-clockwise direction may be indicated by a negative angular position (e.g., −1 degrees to −179 degrees relative to the neutral position). The angular position can, of course, be positive and vary from 1 degree to 360 degrees.

Range detector 254 generally detects when boom 104 is in one of a plurality of different degree ranges of rotation about axis 107. Each degree range can be defined to include an upper degree limit and a lower degree limit. That is, range detector 254 compares the upper and lower degree limits of the degree range to the angular position of the implement. For example, range detector 254 can detect when boom 104 is positioned within a range having an upper degree limit of 45 degrees and a lower degree limit of 0 degrees. More specifically, range detector 254 is configured to detect a particular range, from the plurality of different degree ranges of rotation, that boom 104 is located in, based on the sensed angular position of boom 104, and the sensed direction of rotation of boom 104, about axis of rotation 107.

Operation characterization logic 256 illustratively includes a movement type detector 268, an attachment use detector 270, and a time aggregator 272, among other operation characteristic detectors 274. Operation characterization logic 256 is generally configured to receive an operation characteristics signal indicative of operation characteristics sensed on the mobile machine. Based on the operation characteristics, operation characterization logic 256 generates an operation indication, indicative of an operation performed by the mobile machine. Operation characterization logic 256 therefore generates signals indicating one or more characteristics of the activity being performed by mobile machine 102.

Movement type detector 268 identifies a type of movement of boom 104. That is, movement type detector 268 generates signals that characterize movement of boom 104 as one or more types of movement, based on the operation characteristics (and/or based on sensor signals from sensor interface logic 250). For instance, boom 104 can be controlled by operator 236 (via user input mechanisms 234, such as a joystick), to move from a first position to a second position. The manner in which boom 104 is moved from the first position to the second position can also be controlled. Boom 104 can be moved slowly with long fluidic-like movements. It can also be moved quickly with short, halting or chopping movements. Boom 104 can also be controlled to, for example, extend, retract, raise, lower, and articulate, while remaining at a particular angular position or while moving between angular positions. As such, movement type detector 268 identifies a type of movement that characterizes actual, sensed movement of boom 104. Some example types of movement include, but are not limited to: a burst swing, a long swing, an arm extension, an arm retraction, an arm raising, and an arm lowering, etc. These can be used to help determine what operation mobile machine 102 is performing.

Attachment use detector 270 identifies a type of use of an attachment controllably attached to the mobile machine. That is, attachment use detector 270 identifies a type of use of an attachment 106 based on the operation characteristics (and/or based on sensor signals from sensor interface logic 250). As discussed above, attachment 106 can be controlled by operator 236 (via user input mechanisms 234, such as a joystick, buttons, triggers, etc.) to actuate one or more features of attachment 106. Actuatable features can include a feature that controls a saw (e.g., implement 106-1), knives (implement 106-2), jaws of a grapple (e.g., grapple 105), etc. Therefore, attachment use detector 270 is configured to identify a type of use of one or more controllable subsystems 218, such as boom system 230, delimbing system 229, and/or cutting system 231. For instance, the signals may indicate such things as: saw actuation, knife actuation, grapple actuation, delimbing system use, cutting system use, etc. These signals can also be used to determine the operation being performed by mobile machine 102.

Time aggregator 272 generally aggregates a time that the various different signals occur. That is, time aggregator 272 detects an operating time of mobile machine 102. Time aggregator 272 detects the various different signals, such as signals indicating mobile machine 102 operated in the detected degree range and/or according to operation characteristics of a particular work-cycle (e.g., type of attachment use, movement, etc.). It aggregates time measures, for each of the detected signals, to provide a timewise view of an operation of mobile machine 102. As such, time aggregator 272 is configured to generate a signal indicating an aggregated amount of time that mobile machine 102 operates with boom 104 at angular positions located within the different degree ranges. It can do this by recording a timestamp when it enters a particular degree range and a timestamp when it exits. For instance, the timewise view might show how much time boom 104 operates in the detected degree range and/or according to the detected operating characteristics. This time-wise view might be used to accurately characterize performance of mobile machine 102, such as how quickly machine 102 processes material that is located in a geographic location corresponding to the detected degree range. For example, time aggregator 272 might generate a signal indicating that mobile machine 102 has operated with boom 104 in the degree range of 0 degree to 45 degrees for twenty minutes. This can be used, along with the signals generated by operation characterization logic 256, to determine how long mobile machine 102 spent on each of the different operations that it performs, and therefore to generate timewise views for each work cycle performed by mobile machine 102.

Generally, work cycle detection logic 258 receives a wide variety of information and signals, including any of the signals generated by sensor interface logic 250, angle detector 252, range detector 254, operation characterization logic 256, and time aggregator 272, among others. Work cycle detection logic 258 detects a particular work cycle, from a plurality of different work cycles, that mobile machine 102 is performing at any given time. To detect a particular work cycle, work cycle detection logic 258 accesses a mapping. The mapping, generated by work cycle map generator 264 (as discussed in greater detail below), maps each degree range to a work cycle. Work cycle detection logic 258 uses the degree range where boom 104 is located to identify a particular work cycle being performed by mobile machine 102, based on the mapping. Work cycle detection logic 258 can also utilize the signals generated by operation characterization logic 256 to identify whether mobile machine 102 is performing an operation. For instance, the mapping can also store an association between each work cycle and certain parameters that define characteristics of machine operation. Assume, for instance, that boom 104 is currently being operated at an angular position located within the degree range of 0 degrees to 45 degrees. Assume also that operation characterization logic 256 characterizes the movement machine 102 as short swing motions (e.g., of boom 104) with grapple actuation (e.g., of grapple 105). Accordingly, by combining the position information showing what degree range boom 104 is in, with the characteristics of its movement or operation in that degree range, and with an operating time indicating that mobile machine 102 is operating at the degree range for a certain amount of time, work cycle detection logic 258 detects that mobile machine 102 is performing a pre-processing, sorting operation having the detected characteristics.

In one example, each work cycle detected by work cycle detection logic 258 has one or more operating characteristics (which may be characteristics of mobile machine 102, boom 104, controllable implements 106, grapple 105, etc.). The operating characteristics can be used, along with the rotational position of boom 104, to more accurately identify one of the operations mobile machine 102 is performing at areas 110-120, at a given time. With respect to the example shown in FIG. 1, for instance, each work cycle has operating characteristics that occur when mobile machine 102 is performing any of: a raw material sorting cycle in area 110, a delimbing cycle in area 112, a topping or cut-to-length cycle in area 114, a post-processing sorting cycle in area 116, a loading cycle in area 118, or an idle cycle in area 120. Thus, if the time spent in each cycle is identified, it can be aggregated to represent measured performance of mobile machine 102 for a single cycle of operation, in multiple cycles of each operation, and across all operations.

Calibration logic 262 generally detects inputs to define a degree range for the different operations. It can also detect inputs that define operating characteristics of mobile machine 102 for each of the different work cycles. The operating characteristics and degree ranges can be automatically learned or preexisting default values as well. Calibration logic 262 illustratively includes calibration input logic 288, range definition logic 276, operation definition logic 278, and cycle selection logic 280, among a wide variety of other calibration components 282. In the example described herein, calibration logic 262 provides mechanisms that allow a user (e.g., user 286 and/or operator 236) to provide user inputs to define degree ranges and/or operating characteristics for each work cycle.

Calibration input logic 288 is configured to detect a calibration input. For instance, calibration input logic 288 controls user interface logic 248 to generate a representation of a calibration user interface for display on a display device (e.g., user interface device 208). The calibration user interface can include one or more user input mechanisms, and calibration input logic 288 detects user actuation of the user input mechanisms. For example, calibration input logic 288 is configured to detect a calibration input indicating that a calibration mode is being entered. The operator then moves boom 104 to a first angular position about axis 107 and actuates an actuator to set a first degree limit for a first degree range. The operator then moves boom 104 to a second angular position about axis 107 and actuates an actuator to set a second degree limit for the first degree range. The operator then inputs an indication of a work cycle that corresponds to those degree limits, and inputs operating characteristics that correspond to the selected work cycle. Range definition logic 276 receives an indication of the calibration inputs and, based on the indication, defines a degree range of rotation about axis 107, including the upper degree limit and the lower degree limit for that degree range. Operation definition logic 278 receives an indication of the calibration inputs and, based on the indication, surfaces a user interface that allows the operator to identify any of the operating characteristics discussed above (e.g., with respect to operation characterization logic 256). Cycle selection logic 280 receives an indication of the calibration inputs and, based on the indication, surfaces a user interface that allows the operator to select a particular work cycle to correspond to the defined degree range and the defined operating characteristics. Calibration logic 262 generates signals indicating the selected parameters that are to be mapped to the selected work cycle.

Work cycle map generator 264 receives indications of the signals generated by calibration input logic 288 and, based on the indications, generates a mapping that maps the degree ranges and characteristics to the corresponding work cycles. Work cycle map generator 264 generates the mapping to store associations between each of the work cycles that are defined, and the parameters defined for these work cycles, such as the defined degree ranges and the corresponding operating characteristics, etc. In this way, during operation, work cycle detection logic 258 can access the mapping to determine whether the detected information (such as the current degree range that boom 104 is in, the sensed operating characteristics, etc.), is mapped to a given work cycle.

Action signal generator 260 generates an action signal, based on signals output by any or all of the items of work cycle detection and control system 140 (e.g., user interface logic 248, sensor interface logic 250, angle detector 252, range detector 254, operation characterization logic 256, time aggregator 272, work cycle detection logic 258, calibration logic 262, work cycle map generator 264, etc.), among a wide variety of other signals or information. Action signal generator 260 generates action signals that are configured to automatically or semi-automatically control mobile machine 102, such as an action signal that controls one or more controllable subsystems 218 (e.g., boom system 230). Action signal generator 260 can also generate action signals that provide indications of performance analysis, for a detected work cycle, on a representation of a user interface display (e.g., on user interface device 208).

Action signals generated by action signal generator 260 can indicate a measured performance of a particular machine for a detected work cycle, identify a comparison between two different machines operating in a same detected work cycle, provide a user display signal to display an indication of the detected work cycle, indicate a corrective action for operating mobile machine or for controlling a wide variety of different operator assistance features, indicate a calibration setting that is selected during a calibration operation, among other things. In one example, action signal generator 260 generates an indication of a measured output of mobile machine 102 for a detected work cycle, and provides the indication for representation on a user interface. In one example, action signal generator 260 generates instructions that control boom 104 to improve performance when mobile machine 102 is operating in the detected work cycle.

Figure 3:
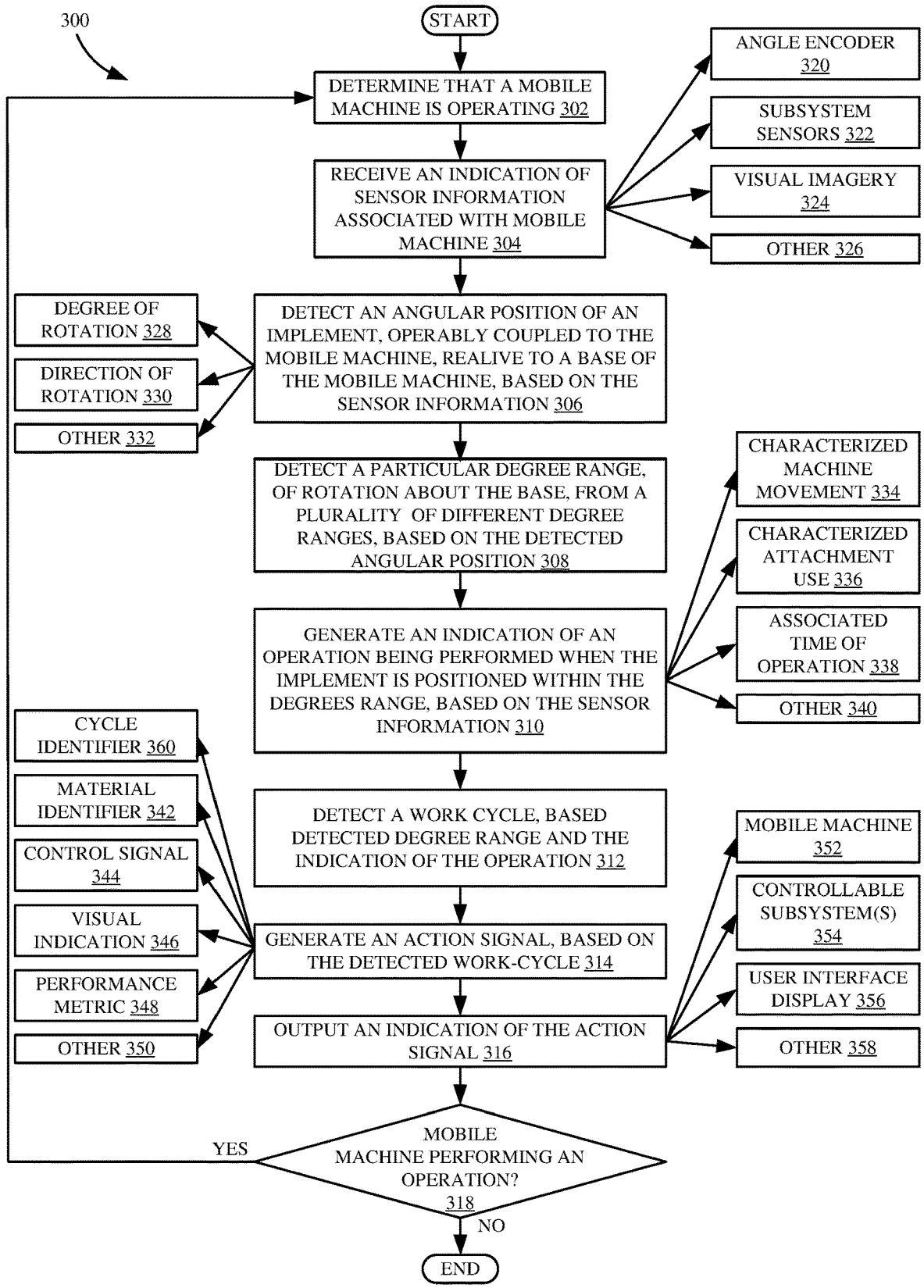
FIG. 3 illustrates a flow diagram showing one example of performing & work cycle detection and control operation.

FIG. 3 illustrates a flow diagram showing one example of performing a work cycle detection and control operation 300. At block 302, work cycle detection and control system 140 receives an indication that work cycle detection and control is to be performed for mobile machine 102 operating at jobsite 101. The indication can be based on a user input indicating a user selection of the operation, or it can be based on one or more processes that automatically trigger selection of the operation. At block 302, work cycle detection and control system 140 can determine that mobile machine 102 is associated with a preexisting mapping. Work cycle detection and control system 140 can therefore determine that mobile machine 102 has undergone a calibration process to generate a mapping that maps various degree ranges and operating characteristics to the work cycles of mobile machine 102. The calibration process to generate the mapping is discussed in greater detail below with respect to FIG. 5.

At block 304, sensor interface logic 250 receives sensor information from mobile machine 102, such as sensor signals from sensor(s) 206. Sensor interface logic 250 can receive sensor information from an angle encoder, as indicated at block 320, from sensors on subsystems of mobile machine 102, as indicated at block 322, from visual imagery or other sensors (e.g., LIDAR/Radar, camera, laser, etc.), as indicated at block 326, and from a wide variety of other sensors, as indicated at block 326.

At block 306, angle detector 252 detects an angular position of an implement or piece of equipment operably coupled to mobile machine 102, such as an angular position of boom 104, based on the sensor information. Block 306 can include angle detector 252 detecting the angular position as a degree of rotation of boom 104 about its axis of rotation 107, as indicated at block, 328. Angle detector 252 can also detect, if needed, a direction of rotation of boom 104, as indicated at block 330. For instance, angle detector 252 can detect that boom 104 was rotated in a clockwise direction or that boom 104 was rotated in a counter-clockwise direction about its axis of rotation. Angle detector 252 can also detect a wide variety of other angular position information, as indicated at block 332.

At block 308, range detector 254 detects a range of degrees of rotation about axis 107 that boom 104 is operating in. For example, assuming that boom 104 is rotated to an angular position of 48 degrees about axis 107, range detector 254 might detect that boom 104 is positioned within a range of 46 degrees to 135 degrees (e.g., in the clockwise direction of rotation about axis 107). Block 308 therefore includes range detector 254 detecting a plurality of different degree ranges, identifying a particular degree range in which the angular position of boom 104 is located, and generating one or more signals indicating the particular degree range that is detected.

At block 310, operation characterization logic 256 identifies an operation being performed by mobile machine 102 when boom 104 is positioned in the detected degree range. Block 310 illustratively includes operation characterization logic 256 generating an indication of the identified operation. As similarly discussed above with respect to FIG. 2, operation characterization logic 256 can generate a wide variety of different signals indicating an identified operation of mobile machine 102. As shown in FIG. 3, generating an indication of an identified operation of mobile machine 102 includes movement type detector 268 detecting a type of movement of mobile machine 102, as indicated at block 334. It can also include attachment use detector 270 detecting a type of use of attachment 106, as indicated at block 336. As indicated at block 338, it can also include time aggregator 272 aggregating the various signals to provide a timewise view of an operation being performed by mobile machine 102, for a time period when boom 104 in the detected degree range. Operation characterization logic 256 can generate indication of a wide variety of other operating characteristic information, as indicated at block 340, as well.

At block 312, work cycle detection logic 258 detects a particular work cycle, from a plurality of different work cycles, that mobile machine 102 is performing at any given time. Block 312 includes work cycle detection logic 258 accessing the preexisting mapping to determine that the detected degree range and/or other operating characteristics (e.g., detected type of boom 104 movement) are mapped to the particular work cycle. As such, work cycle detection logic 258 might compare the detected degree range, in which boom 104 is angularly positioned, to the degree ranges and the work cycles mapped in the mapping. Accordingly, at block 312, work cycle detection logic 258 determines that the particular work-cycle is mapped to the detected degree range (and thus to the detected position of boom 104) and the detected operating characteristics. Assume, for instance, that boom 104 operated at detected angular position that is located within the degree range of 0 degrees to 45 degrees. Assume also that operation characterization logic 256 characterizes the movement machine 102 as short swing motions (e.g., of boom 104) with grapple actuation (e.g., of grapple 105). Accordingly, by comparing the detected degree range (e.g., and with detected characteristics of its movement or operation and/or detected time of operation in that degree range) to various degree ranges in the mapping (and other various operating characteristics and/or time measures in the mapping), work cycle detection logic 258 identifies the work cycle that mobile machine 102 is performing as a pre-processing, sorting operation that is mapped to the detected degree range.

At block 314, action signal generator 260 generates an action signal, based at least in part on the detected work cycle. Action signal generator 260 can generate an action signal including a work cycle identifier that identifies the detected work cycle, as indicated at block 360. Action signal generator 260 can generate a material identifier 342 that identifies a type or amount of material that is processed while mobile machine 102 is performing the detected work cycle. Material identifiers might indicate, for example, a type of wood (e.g., hardwood or softwood, etc.), a species of tree, a measured characteristic of the material (e.g., a stem length, average diameter, etc.), among other material information. Action signal generator 260 can also or alternatively generate a control signal that includes instructions for controlling mobile machine 102, as indicated at block 344. Control signals can include signals that control one or more portions or controllable subsystems 218, attachments 106, user interface logic 210, etc. Action signal generator 260 can also or alternatively generate a visual indication, such as a notification that is represented on a user interface display (e.g., user interface device 208), as indicated at block 346. Further, action signal generator 260 can also or alternatively generate a performance metric, such as a measure of volume of material processed by mobile machine 102 while operating in the detected work cycle, as indicated at block 348. It is noted that these are examples only, and action signal generator 260 generates a wide variety of other action signals, as indicated at block 350.

At block 316, action signal generator 260 outputs an action signal to perform an action. Action signal generator 260 generally provides the action signal, generated for the detected work cycle, to one or more of a wide variety of systems and machines. In one example, action signal generator 260 controls communication component 246 to provide the action signal to mobile machine 102. This is indicated at block 352. For instance, block 352 includes outputting the action signal to control data store(s) 214 and outputting it to control signal generator 224 to generate other controls. Outputting the action signal also illustratively includes action signal generator 260 generating control signals, based on the action signal, to control controllable subsystems 218, as indicated at block 316. For instance, it generates a control signal to control boom system 230 to control movement of boom 104. Action signal generator 260 can also or alternatively output the action signal to a user interface display (e.g., user interface device 208), as indicated at block 316. Action signal generator 260 can also output the action signal in a wide variety of other ways as well, as shown at block 358.

At decision block 318, work cycle detection and control system 140 determines whether mobile machine 102 is still performing an operation. That is, work cycle detection and control system 140 utilizes sensor interface logic 250 to determine if any sensor signals indicate that mobile machine 102 is currently performing an operation at jobsite 101. If work cycle detection and control system 140 determines that mobile machine 102 is performing an operation, an indication of sensor information associated with the mobile machine is received at block 304. However, if work cycle detection and control system 140 determines that mobile machine 102 is not currently performing an operation, the work cycle detection and control operation ends.

Figure 4A:
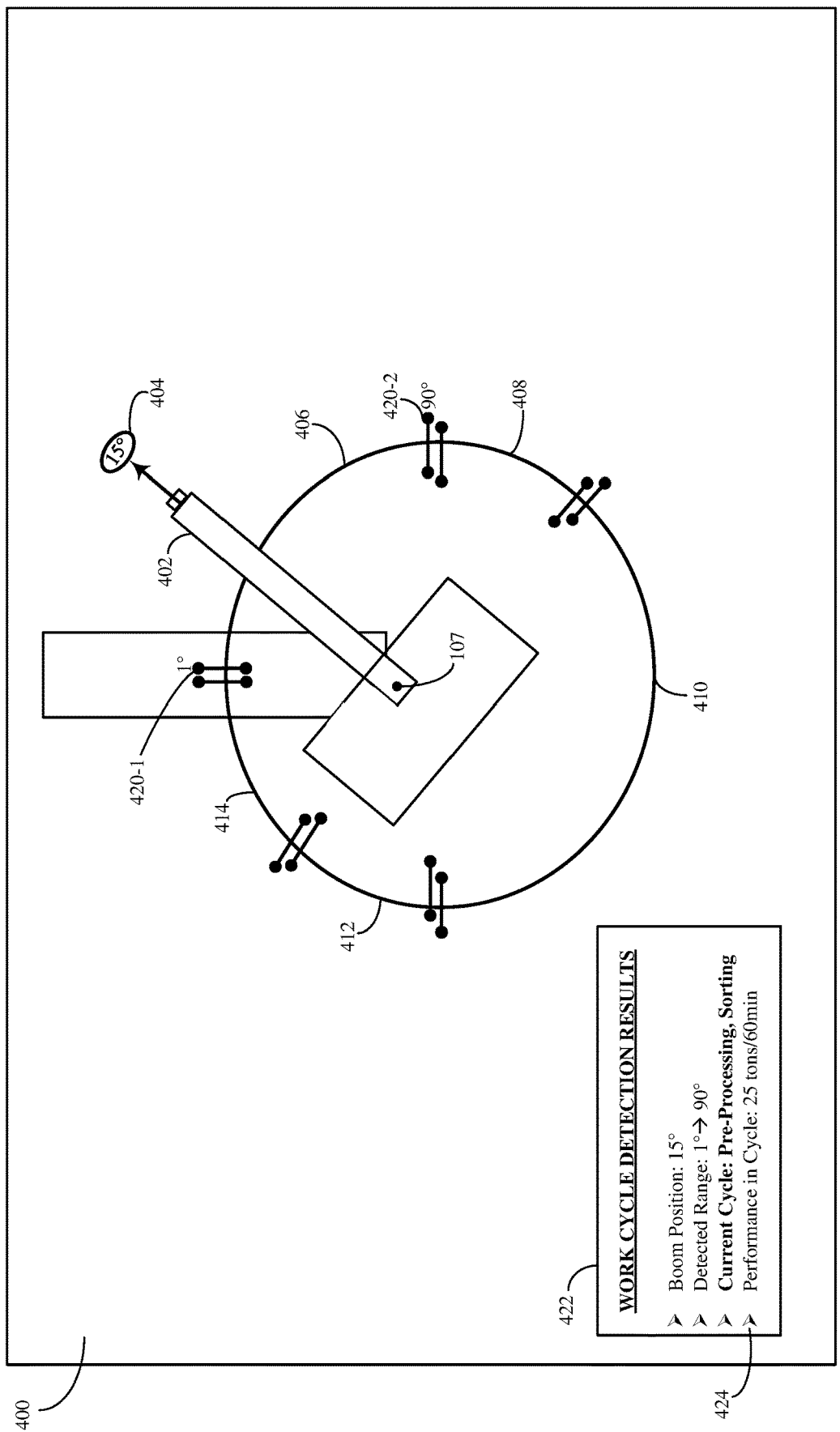
FIGS. 4A-4B illustrate example user interface displays that can be generated in performing the work cycle detection and control operation shown in the previous Figures.

FIG. 4A illustrates an example user interface display 400 that visually represents action signals generated using work cycle detection and control system 140 shown in the previous Figures. User interface display 400 can generally include a representation of a graphical user interface that is displayed on user interface device 208 to visually notify operator 236 of the generated action signals. In the illustrated example, user interface display 400 illustratively includes an angular position indicator 402. Angular position indicator 402 generally identifies the angular position of boom 104, as detected by angle detector 252. In the example shown in FIG. 4A, angular position indicator 402 is an arrow icon that visually represents a current rotational position of boom 104 about its axis 107. User interface display 400 can also include an angle indicator 404, which generally notifies operator 236 of the actual detected degree of rotation of boom 104 about axis 107. In the example shown in FIG. 4A, angle indicator 404 indicates that boom 104 is rotated 15 degrees from neutral about axis 107.

User interface display 400 can also display indications of action signals to visually identify the various degree ranges about the axis. That is, user interface display 400 can visually identify the various degree ranges detected by range detector 254. In the example shown in FIG. 4, user interface display 400 illustratively displays degree range indicators 406-416. Each degree range indicator 406-416 can be displayed with corresponding upper and lower degree limits for its detected degree range. In the example shown in FIG. 4A, the degree range indicated by degree range indicator 406 is visually represented with an upper limit indicator 420-1 and a lower limit indicator 420-2. Upper limit indicator 420-1 visually indicates that the degree range corresponding to degree range indicator 406 has an upper degree limit of 1 degree, while lower limit indicator 420-2 visually indicates that the degree range corresponding to degree range indicator 406 has a lower limit of 90 degrees. While limit indicators 420-1 and 420-2 are shown in FIG. 4A for the degree range indicated by degree range indicator 406, it is noted that user interface display 400 can visually display limit indicators for any or all of the detected degree ranges, as indicated by degree range indicators 408-416.

User interface display 400 can also provide a notification 422 that visually indicates the detected work cycle, as detected by work cycle detection logic 258, for a current operation that mobile machine 102 is performing. Notification 422 can also identify a current rotational position of boom 104, as well as the detected range in which the rotational position is located. In the illustrated example, notification 422 is displayed to indicate that boom 104 is rotated 15 degrees about axis 107 from the neutral position, that boom 104 is positioned within the detected degree range of 1 degree to 90 degrees, and that mobile machine 102 is at currently performing a pre-processing, sorting work cycle. Notification 422 can also include an indication of measured performance 424 of mobile machine 102, such as a measured or estimated output of the machine while operating in the detected cycle. For example, the indication of measured performance 424 indicates that mobile machine 102 has processed 25 tons in 60 minutes of operation when boom 104 is positioned in the detected range (indicated by degree range indicator 406).

User interface display 400 automatically updates to show any modifications to the measured performance and/or when boom 104 is moved to various other rotational positions. Therefore, during operation of mobile machine 102, user interface display 400 automatically updates so it can represent actual, current performance of mobile machine 102 across all of the different work cycles.

Figure 4B:
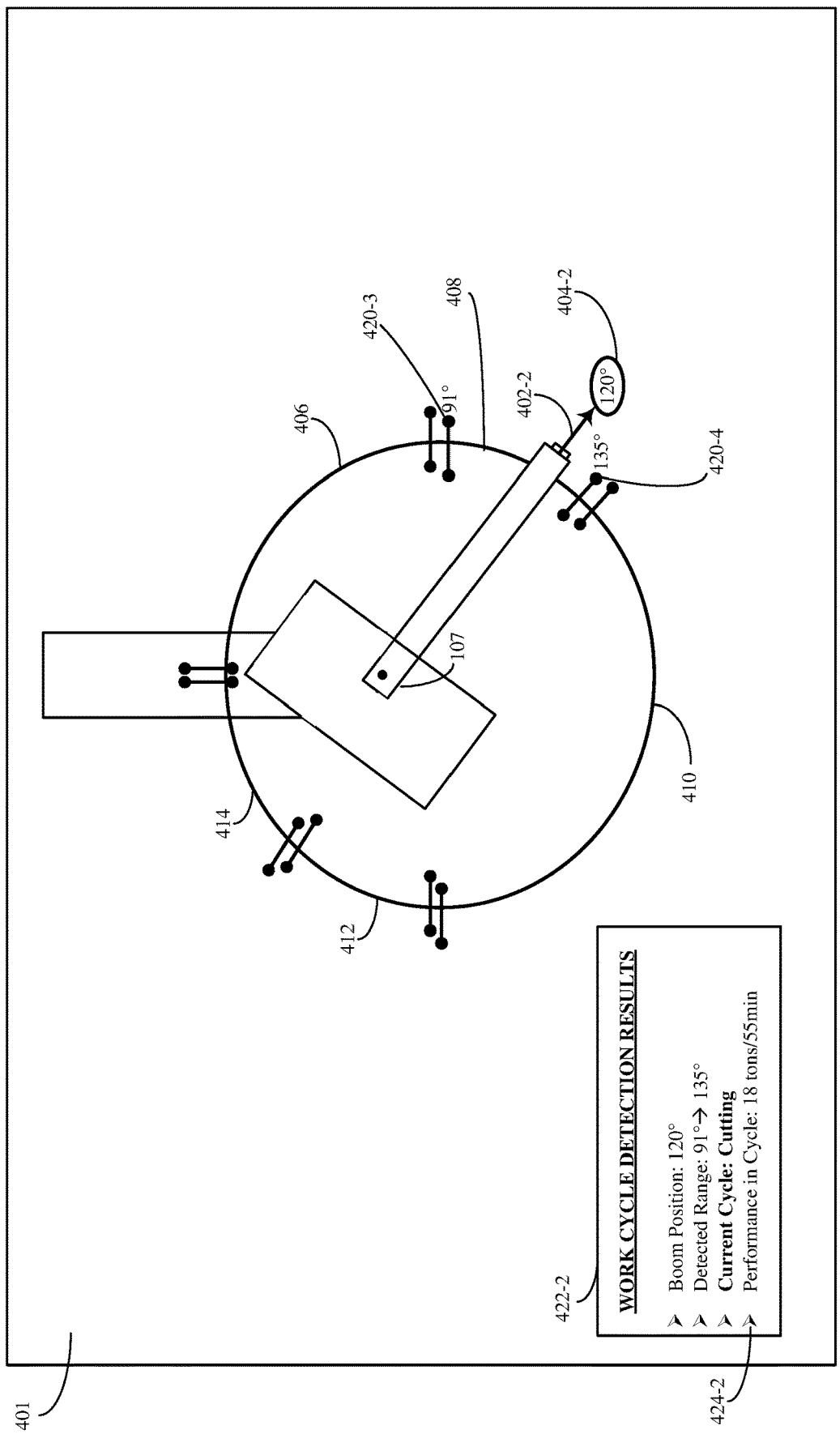

FIG. 4B illustrates an example user interface display 401 that visually represents action signals generated using work cycle detection and control system 140 shown in the previous Figures. User interface display 401 displays many of the same features shown in FIG. 4A on user interface display 400, and they are similarly numbered. However, it is assumed that, during operation, mobile machine 102 has now moved boom 104 from 15 degrees (as represented on user interface display 400) to 120 degrees about axis 107. User interface display 401 therefore shows an example where boom 104 is rotated to perform a different operation (e.g., for a different work-cycle). User interface display 401 is updated to visually represent action signals generated for a newly detected work cycle.

In the example shown in FIG. 4B, it can be seen that user interface display 401 now displays angular position indicator 402-2 and angle indicator 404-2, indicating that boom 104 is now rotated to 120 degrees, from the neutral position, about axis 107. Accordingly, notification 422-2 is updated to visually indicate the detected degree range for the newly positioned boom 104, the detected work cycle for the newly detected degree range, and the measured performance of mobile machine 102 for the newly detected work cycle. In the illustrated example, user interface display 401 visually provides indications that boom 104 is now rotated 120 degrees about axis 107, is positioned within a degree range of 91 degrees to 135 degrees, and is therefore positioned such that mobile machine 102 is performing a cutting operation with a measured performance of 18 tons of trees being cut in 50 minutes of operating time. The measured performance can be modified to show an amount (e.g., of material processed) per hour or otherwise.

Figure 5:
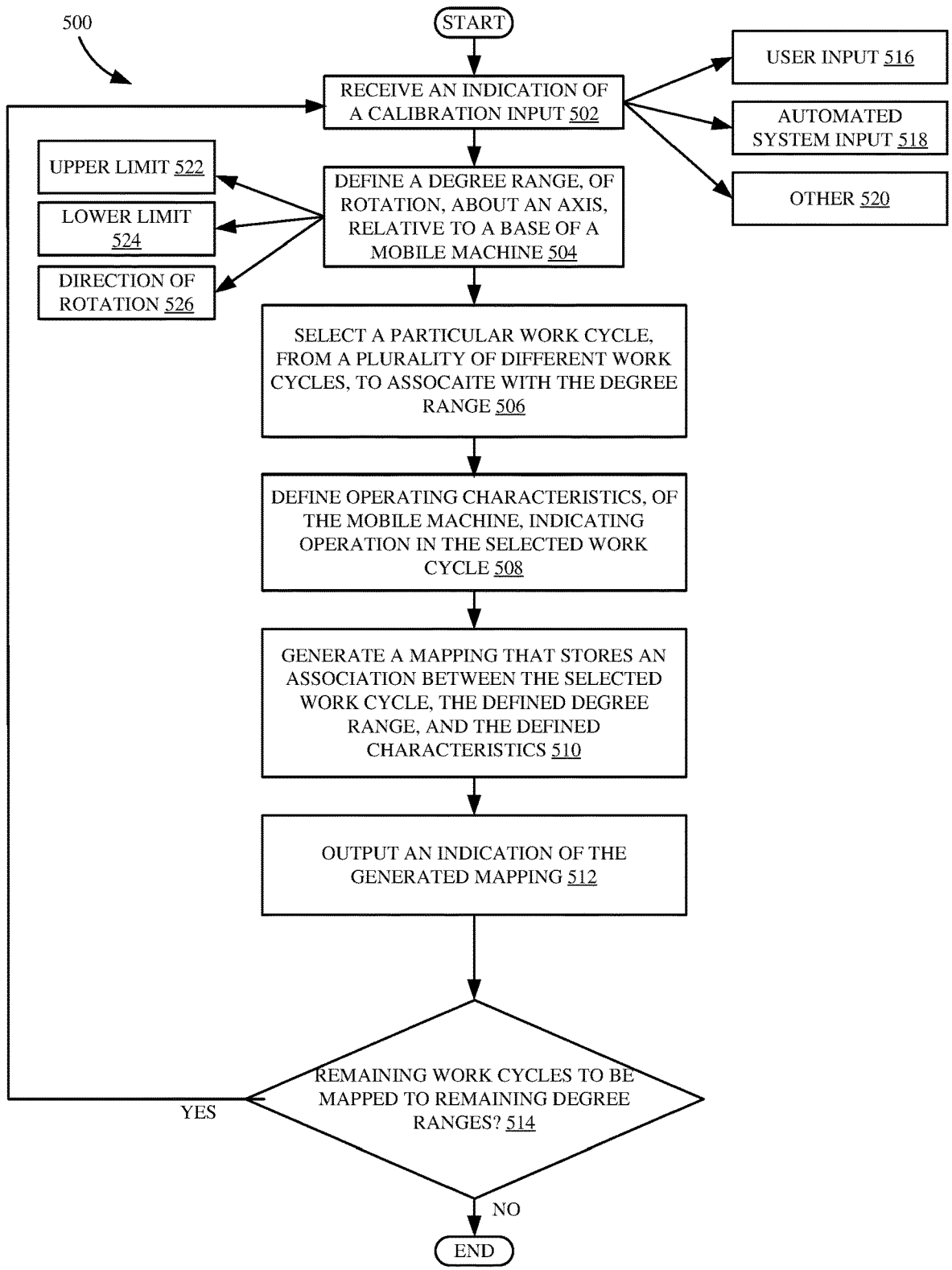
FIG. 5 illustrates a flow diagram showing one example of performing a calibration operation to calibrate the work cycle detection and control system shown in the previous Figures.

FIG. 5 illustrates a flow diagram showing one example of a calibration operation 500 to calibrate work cycle detection and control system 140 shown in the previous Figures. Recall that the calibration operation allows the operator to set the different degree ranges and specify which operations (or work cycles) will be performed in each degree range. In one example, the operator can also specify operating characteristics for each degree range, although these can be pre-defined for each operation or work cycle as well.

At block 502, calibration input logic 288 receives an input to initiate a calibration process. Calibration input logic 288 can receive an input to initiate a calibration process, based on a user input, as shown at block 516. For example, block 516 includes receiving an input from an operator 236 through user input mechanisms 234, indicating that operator 236 wishes to enter a calibration mode. Calibration input logic 288 can also receive a calibration input, based on an automated system input 518. For instance, calibration input logic 288 can identify that mobile machine 102 is attempting to implement a work-cycle detection operation and, in response, automatically determine that a calibration operation is first needed to generate a mapping, and therefore automatically enter the calibration mode. Calibration input logic 288 can receive a wide variety of other inputs, as well, to enter a calibration mode, as indicated at block 520.

Figure 6A:
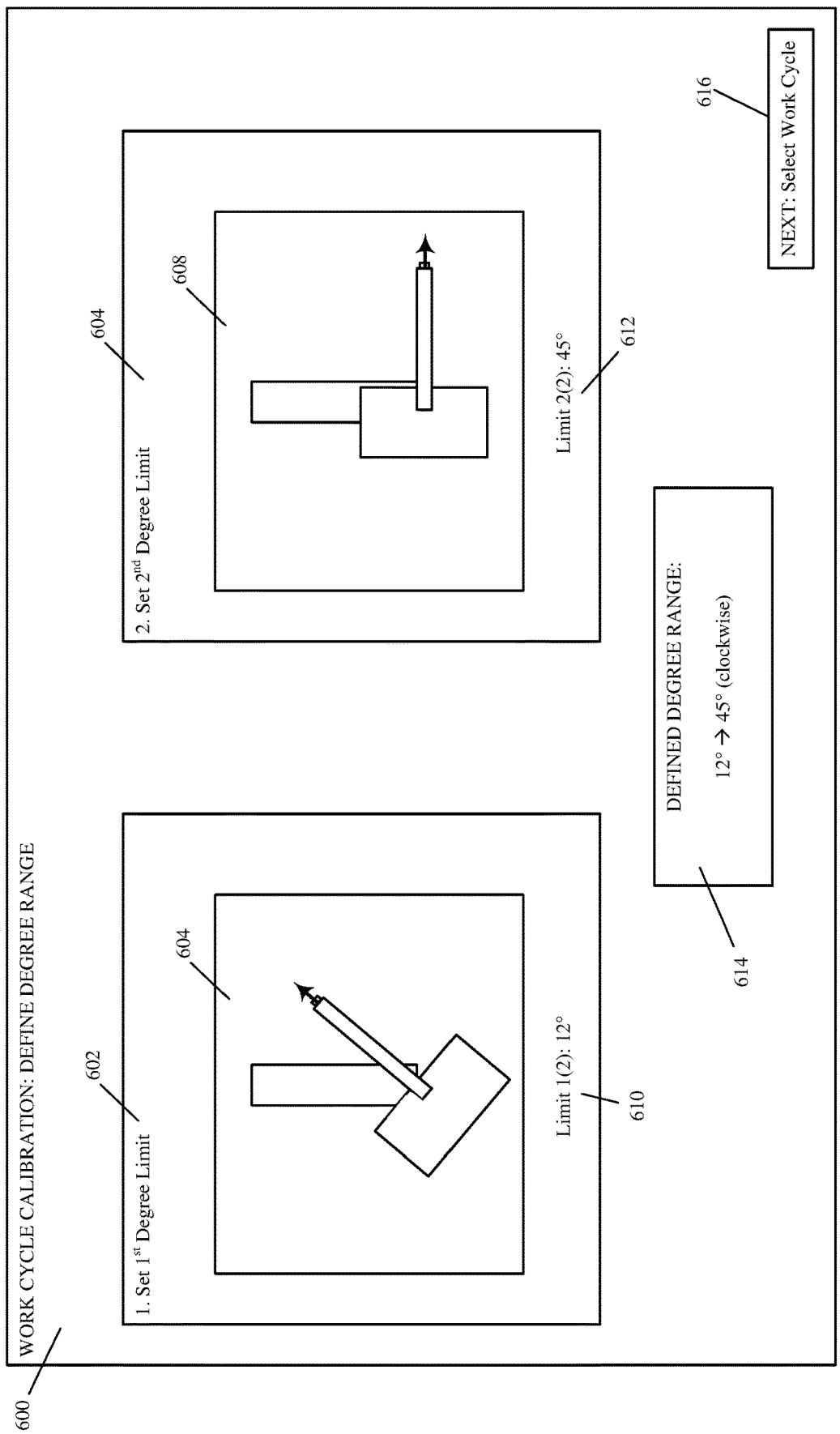
FIGS. 6A-6C illustrate example user interface displays that can be generated in performing the calibration operation shown in FIG. 5.

At block 504, range definition logic 276 defines a degree range, of rotation about axis 107, based on the indication of the calibration user input. Block 504 generally includes defining degree limits for a degree range. Accordingly, an upper degree limit can be defined, as indicated at block 522, and a lower degree limit can be defined, as indicated at block 524. Range definition logic 276 can also define a direction of rotation about the axis, as indicated at block 526. For instance, each degree limit can be assigned a positive or a negative value, indicating where the range is located about axis 107 relative to a neutral position (e.g., clockwise 45 degrees about axis 107 or counter-clockwise 45 degrees about axis 107 indicate two different angular positions of boom 104). FIG. 6A illustrates one example of this part of the calibration process.

FIG. 6A illustrates an example user interface display 600 that can be generated in performing the calibration operation shown in FIG. 5. Namely, user interface display 600 can be generated to define a degree range in accordance with block 504. In the example shown, user interface display 600 can be displayed on user interface device 208 to provide visual indications that assist operator 236 in defining the degree range about axis 107. User interface display 600 illustratively includes indications of a first step 602 for defining a first degree limit in the degree range. In one example, operator 236 might actuate user input mechanisms 234 (e.g., joystick and a joystick trigger) to rotate boom 104 to an angular position of 12 degrees about axis 107. In the illustrated example, window 606 illustratively provides a visual representation 618 of boom 104 about its axis 107, such that a degree indicator 610 visually indicates that boom 104 is positioned at 12 degrees about from neutral its axis 107. Then, operator 236 actuates another user input mechanism 234 to define the current rotational position of boom 104, at 12 degrees about its axis, as the first degree limit for the degree range being defined. User interface display 600 also includes indications of a second step 604 for defining a second degree limit in the degree range. For example, to set a second degree limit, operator 236 can actuate user input mechanisms 234 to rotate boom 104 to a different position about axis 107. In the illustrated example, user interface display 600 provides window 608, which includes a visual representation 620 of boom 104 being moved to 45 degrees from neutral about axis 107, as indicated by degree indicator 612. Then, operator 236 can actuate another user input mechanism 234 to define the current rotational position of boom 104, at 45 degrees about axis 107, as the second degree limit for the degree range being defined. User interface display 600 also includes a notification 614 of the defined degree range. The notification 614 therefore visually indicates that boom 104 has been positioned at angular positions of 12 degrees and 45 degrees, in a clockwise direction of rotation about axis 107, to set a degree range of 12 degrees to 45 degrees. User input mechanism 616 is actuatable to navigate to a user interface display that allows the operator to select a work cycle corresponding to that defined degree range.

Returning to FIG. 5, at block 506, cycle selection logic 280 selects a particular work cycle, from a plurality of different work cycles, to map to the defined degree range. In one example, cycle selection logic 280 receives an indication of a user input and, based on the indication, selects the particular cycle to be mapped to the degree range. Cycle selection logic 280 can select cycles to associate with the degree range in a wide variety of other ways as well.

Figure 6B:
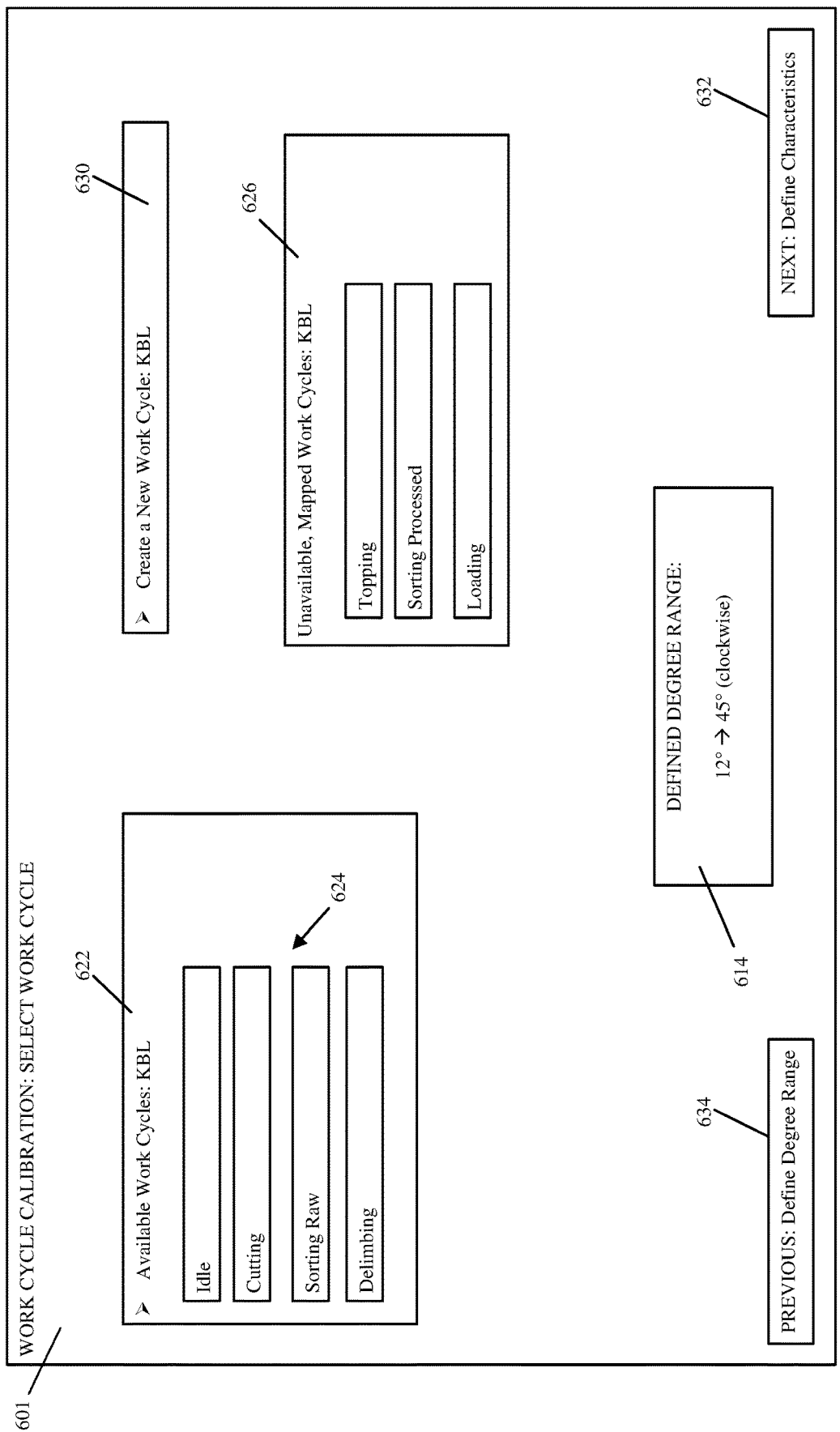

FIG. 6B illustrates another example user interface display 601 that can be generated in performing the calibration operation shown in FIG. 5. Namely, user interface display 601 can be generated to select a particular work cycle, for the defined degree range, in accordance with block 506. User interface display 601 illustratively includes a drop-down menu 622 of available work cycles, each work cycle being indicated by an actuatable cycle selection user input mechanism 624. As such, based on user actuation of a particular cycle selection user input mechanism 624, cycle selection logic 280 can select a particular work cycle that is identified on menu 622. User interface display 601 also illustratively includes a drop-down menu indicating work cycles 626 that are already mapped to degree ranges, where each work cycle is indicated by a corresponding mapped work cycle indicator 628. Further, user interface display 601 includes a user input mechanism 630 that is actuatable to create a new work cycle (e.g., define a name of a new work cycle and store the new work cycle so it is available for generating a mapping). User input mechanism 632 is actuatable to navigate to an interface for defining characteristics of an operation, for the selected work cycle. User input mechanism 639 is actuatable to navigate to the previous interface for defining a degree range.

At block 508, operation definition logic 278 defines characteristics of an operation for the selected work cycle. In one example, operation definition logic 278 receives an indication of a user input and, based on the indication, defines the characteristics. For instance, operator 236 can actuate user input mechanisms 234 to control movement or actuation of mobile machine 102. For example, mobile machine 102 can be operated to control controllable subsystems 218 to perform operations, in the degree range, that will be performed during normal machine control. For instance, if the work cycle for this degree range is a cut-to-length operation, then the operator can perform general cut-to-length operations while in the calibration mode. This movement or control of mobile machine 102 can be automatically detected by operation definition logic 278 using sensor information from sensor interface logic 250. Operation definition logic 278 can then define characteristics of the operation to be associated with the particular work cycle that is selected, such as a type of movement of boom 104, a type of use of attachment(s) 106 or grapple 105, among other machine operating characteristics. These can be stored in the mapping for this work cycle.

Figure 6C:
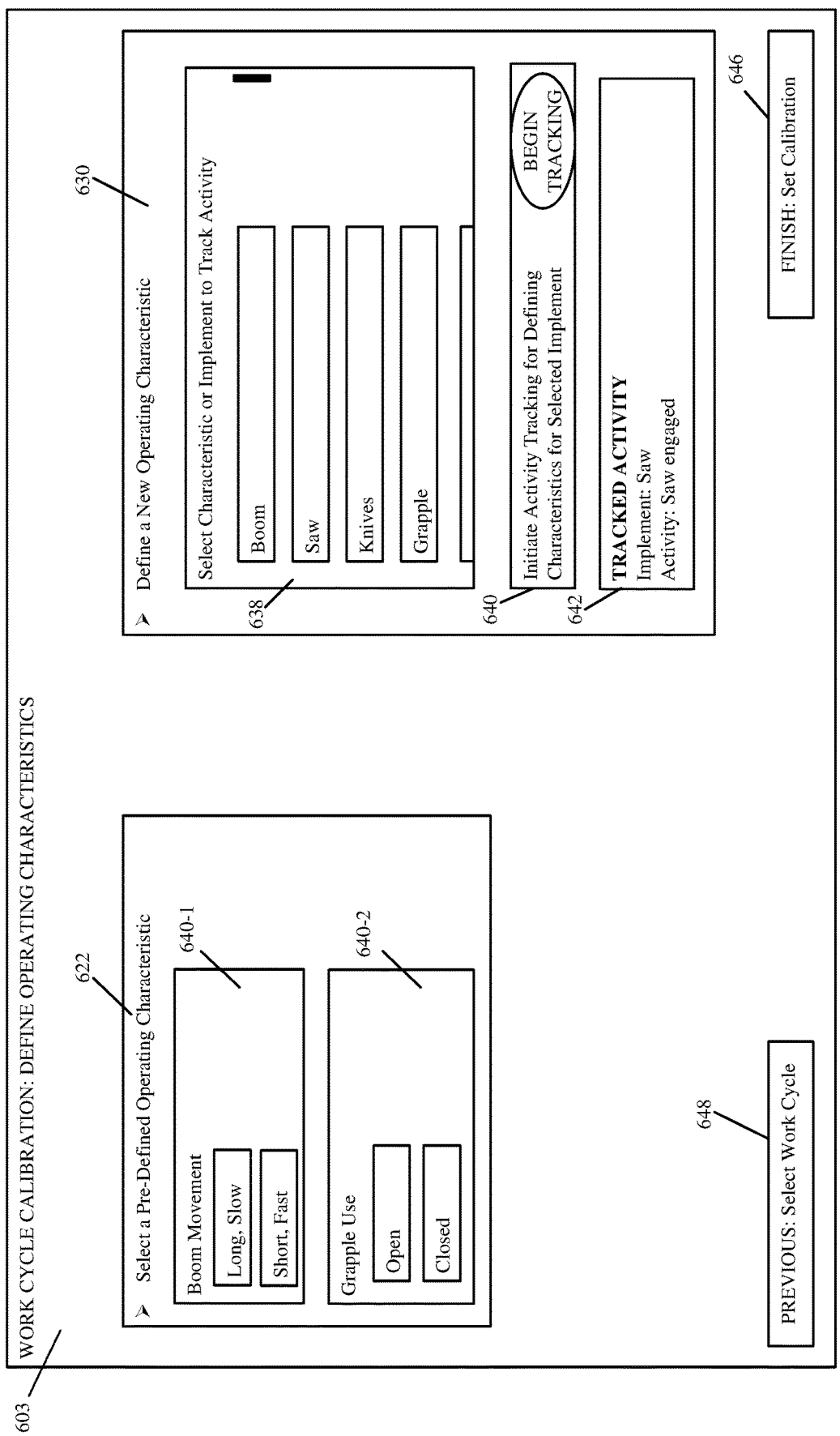

FIG. 6C illustrates another example user interface display 603 that can be generated in performing the calibration operation shown in FIG. 5. Namely, user interface display 603 can be generated to allow the operator to define operating characteristics, for the selected work-cycle, in accordance with block 508. For example, operation definition logic 278 can prompt a user with instructions to select or otherwise define operating characteristics for the selected work cycle. To select preexisting operating characteristics, user interface display 603 illustratively includes a drop-down menu 636 that displays pre-defined operating characteristics. In the illustrated example, user input mechanisms 640-1 and 640-2 provide mechanisms to select swing movement characteristics and grapple actuation characteristics, respectively, as characteristics that are to be mapped to the work cycle.

Of course, these are just examples and a wide variety of other operating characteristics can be predefined for selection during a calibration process. User interface display 603 also illustratively includes a user input mechanism 638 that is actuatable to define a new operating characteristic to be mapped to the work cycle. That is, upon user selection of a particular implement or subsystem (e.g., boom 104, grapple 105, etc.), user input mechanism 640 is actuatable to begin a characteristics tracking operation. Upon actuation of user input mechanism 640, mobile machine 102 is controlled (e.g., via actuation of user input mechanisms 234) to perform operations (by controlling the selected implement or subsystem) for the work cycle. Operation definition logic 278 tracks the operation of mobile machine 102, for the work cycle, for a time period (e.g., for 30 seconds). Therefore, this tracked operation is indicative of operation characteristics while mobile machine 102 is performing operations in the work cycle.

For example, assuming that a user input is received selecting boom 104 to define a new operating characteristic for the work cycle, operation definition logic 278 characterizes the sensed movement, use, and other characteristics of boom 104 during 30 seconds of use of boom 104, as controlled by operator 236. This sensed activity can then be displayed on user interface display 603, as shown at notification 642. Notification 642 generally indicates the sensed activity that will be used to define a new a characteristic of operation of mobile machine 102 for the work cycle. User input mechanism 646 is actuatable to save the calibration, including the degree range and the selected and/or defined operating characteristics, for the work-cycle. User input mechanism 650 is actuatable to navigate to the previous interface for selecting another work cycle.

At block 510, work cycle map generator 264 generates a mapping that stores an association between the selected work cycle, the defined degree range, and the defined operating characteristics. The map can be stored or used by the other systems and machines described herein.

At block 512, action signal generator 260 generates an indication of the map and outputs the indication of the map to any of the items of work cycle detection and control system 140, mobile machine 102, and/or a wide variety of other systems and machines.

At decision block 514, cycle selection logic 280 determines whether all of the available work cycles have been mapped to the degree ranges. If cycle selection logic 280 determines that all of the available work cycles have been mapped, then calibration operation 500 illustratively ends. If however, cycle selection logic 280 determines that any one of the available work cycles has not been mapped (e.g., and a degree range is available to map to the cycle), then calibration input logic 288 can receive a calibration input at block 502 to perform a calibration operation that maps the remaining work cycle(s).

It can thus be seen that the present description provides a system that accurately monitors and controls machine performance according to cycle specific information. This is in contrast to some current systems which use sensors to develop generic machine tracking capabilities. That is, there is difficulty in using some current systems to understand machine performance on a level that characterizes actual activity of the machine as it interacts with material in its immediate vicinity. While some current systems may provide information that shows what a machine does at a given moment in time, it is difficult to associate this information with other operations within a particular cycle of overall operation. Therefore, the present description provides a work cycle detection and control system that monitors and controls machine performance by detecting an angular position of a boom, detecting a degree range in which the angular position of the boom is located, and detecting characteristics of machine operation while the boom is positioned within the range. The work cycle detection and control system then identifies a particular work cycle in which the machine is operating, based on the angular position, degree range, and operating characteristics. Visual indications of the detected work cycle, performance measures, control signals that control the machine, and other action signals can be generated for various operations of the machine, and across the work cycles.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
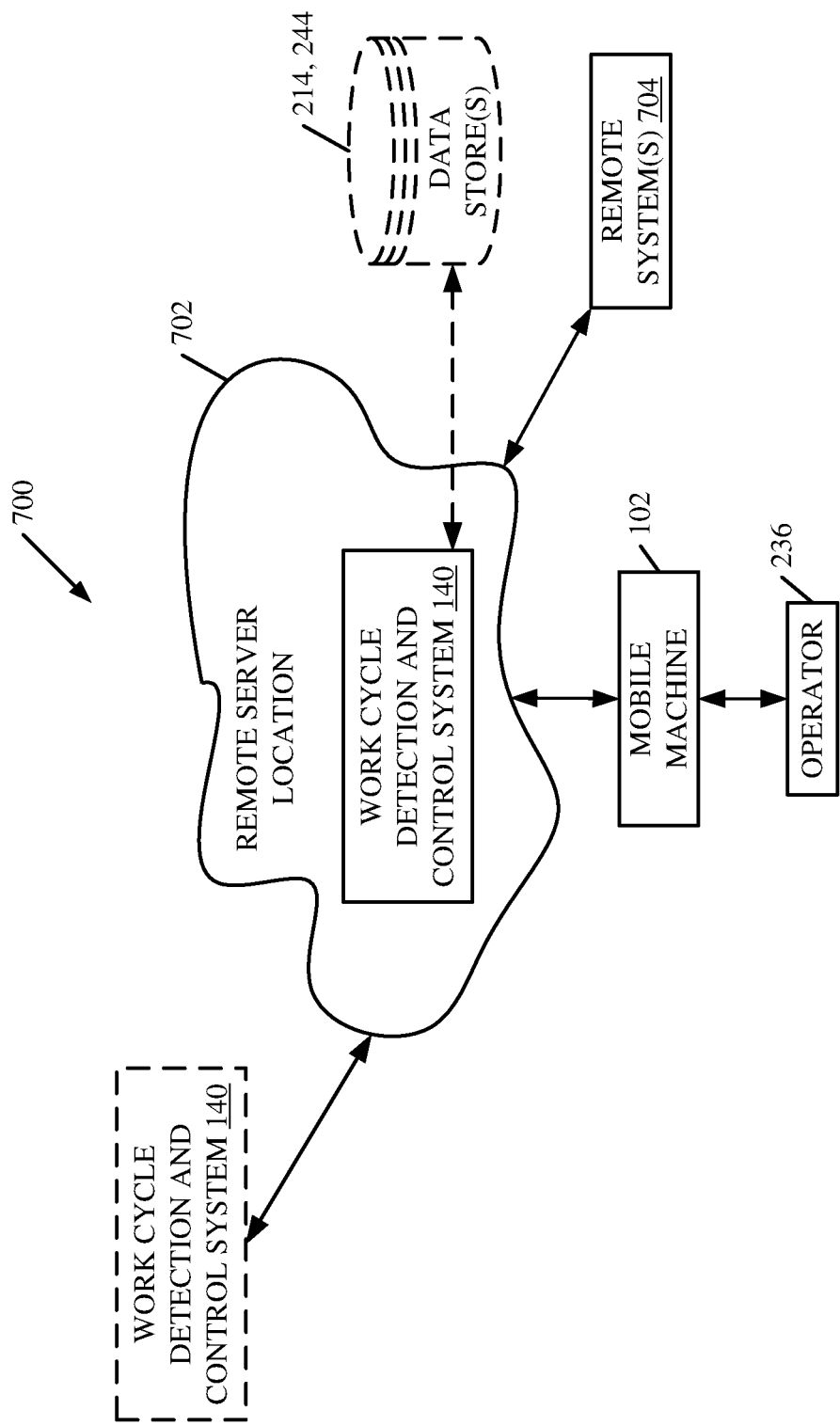
FIG. 7 shows one example of the machine output detection and control system illustrated in previous Figures, deployed in a remote server architecture.

FIG. 7 is a block diagram of architecture 100, shown in FIG. 2, except that it communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows that work cycle detection and control system 140 (or parts of it) can be located at a remote server location 702. Therefore, mobile machine 102 accesses those systems through remote server location 702. FIG. 7 also shows that remote system(s) 704 can be accessed through remote server location 702.

FIG. 7 also depicts another example of a remote server architecture. FIG. 7 shows that it is also contemplated that some elements of FIG. 2 are disposed at remote server location 702 while others are not. By way of example, data stores 214, 244 and work cycle detection and control system 140 can be disposed at a location separate from location 702, and accessed through the remote server at location 702. Regardless of where they are located, they can be accessed directly by mobile machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As mobile machine 102 comes close to the fuel truck for fueling, the system automatically collects the information from mobile machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on mobile machine 102 until the mobile machine 102 enters a covered location. Mobile machine 102, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
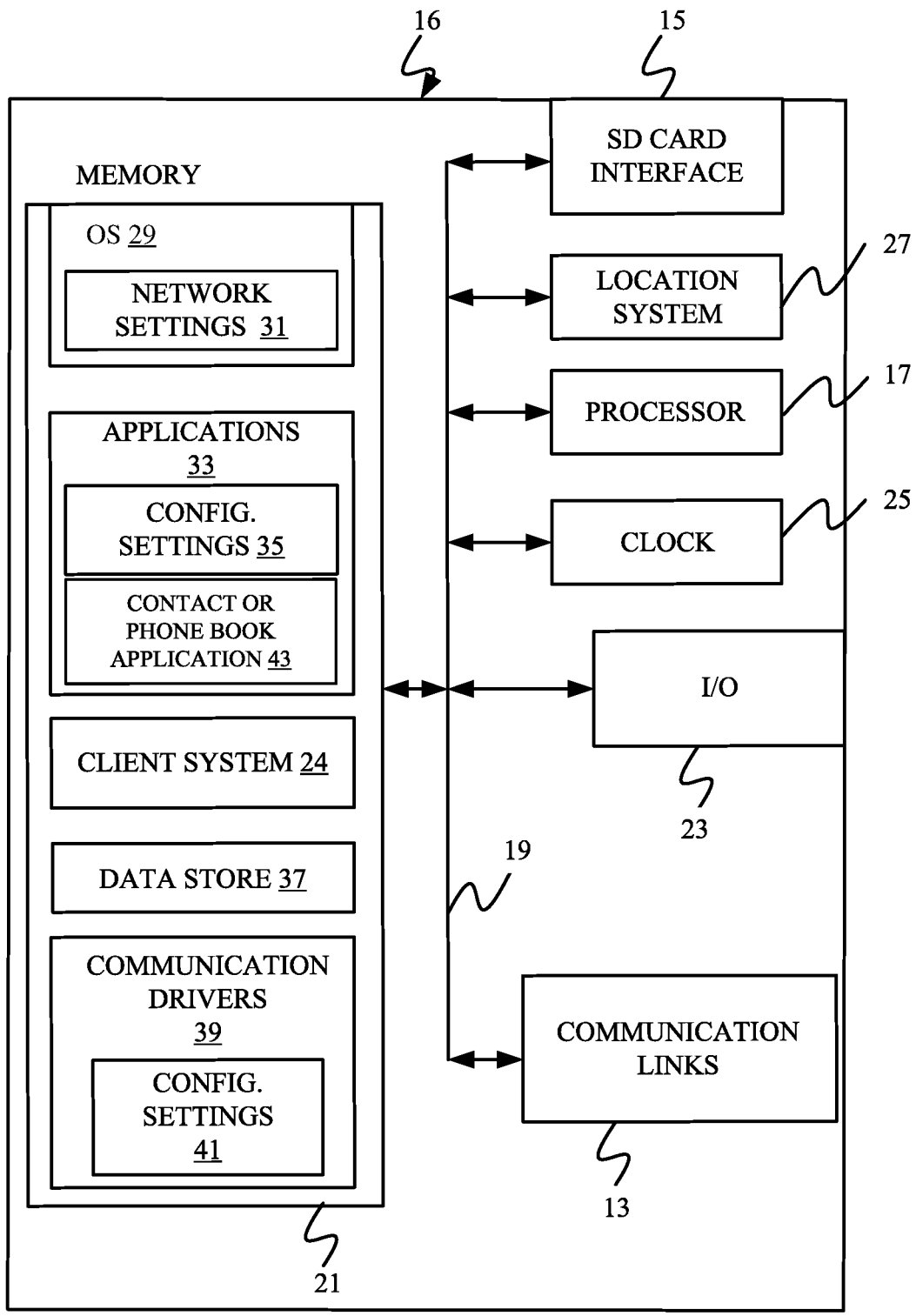
FIGS. 8-10 show examples of mobile devices that can be used in the architectures shown in the previous figures.
Figure 9:
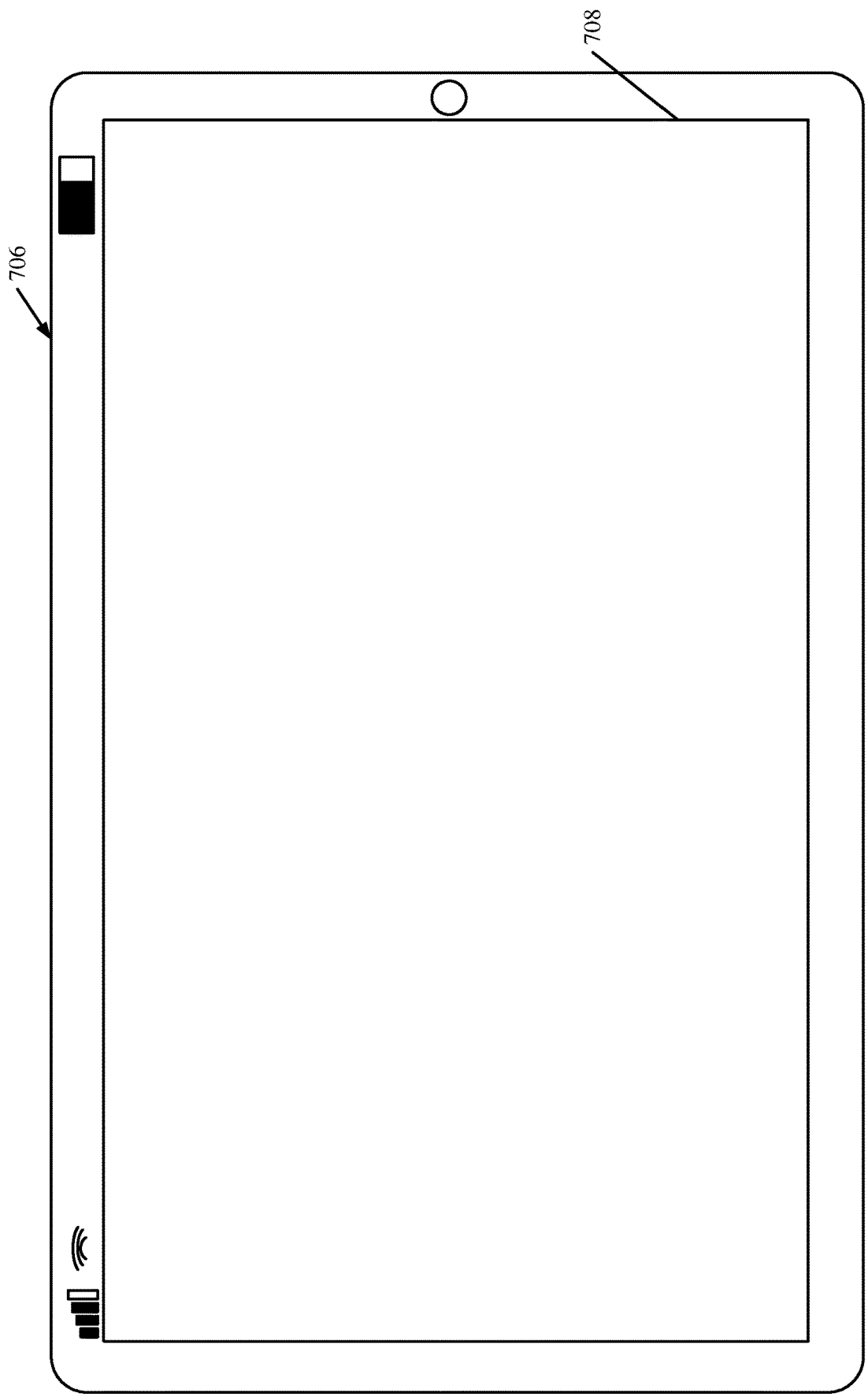
Figure 10:
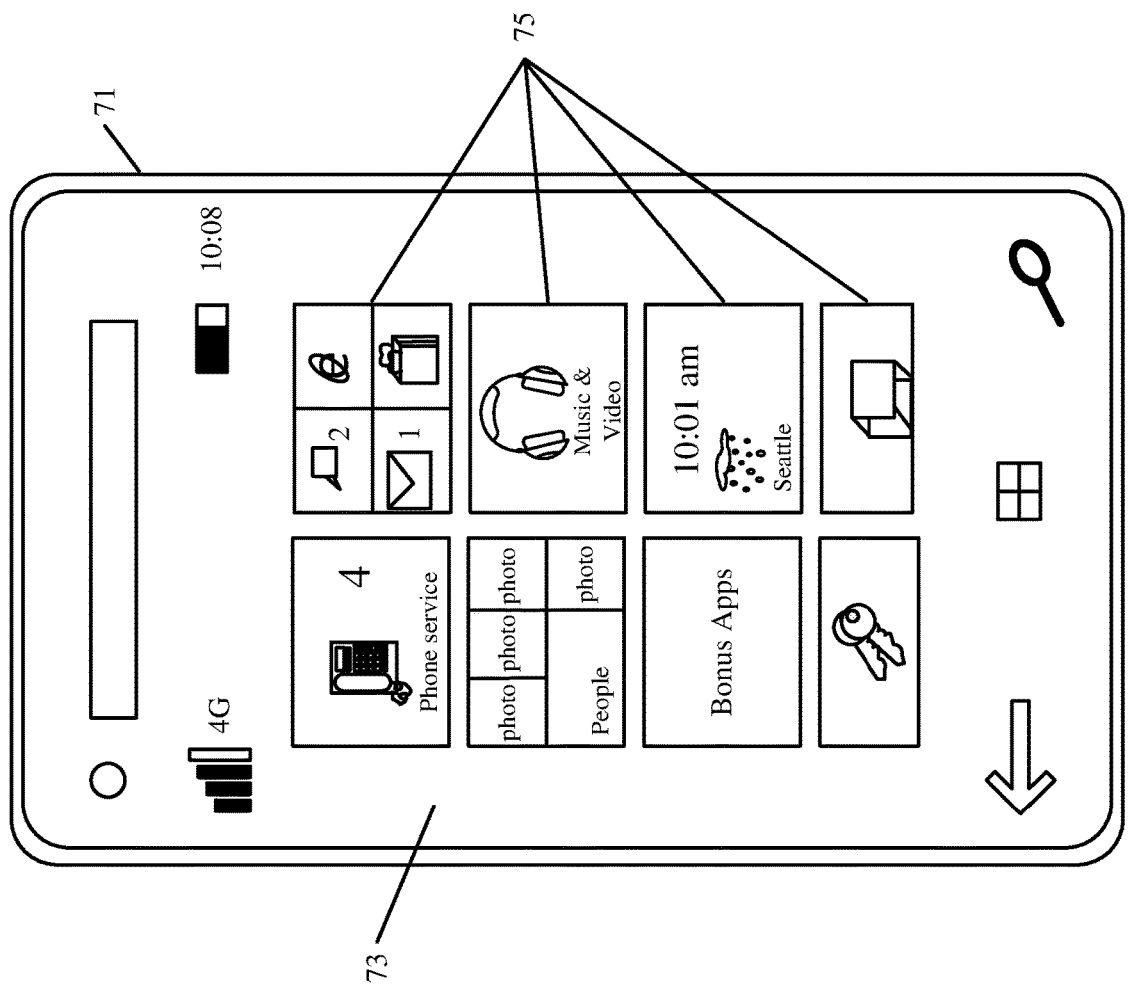

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 102 for use in generating, processing, or displaying the information and user interfaces discussed above. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 706. In FIG. 9, computer 706 is shown with user interface display screen 708. Screen 708 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 706 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
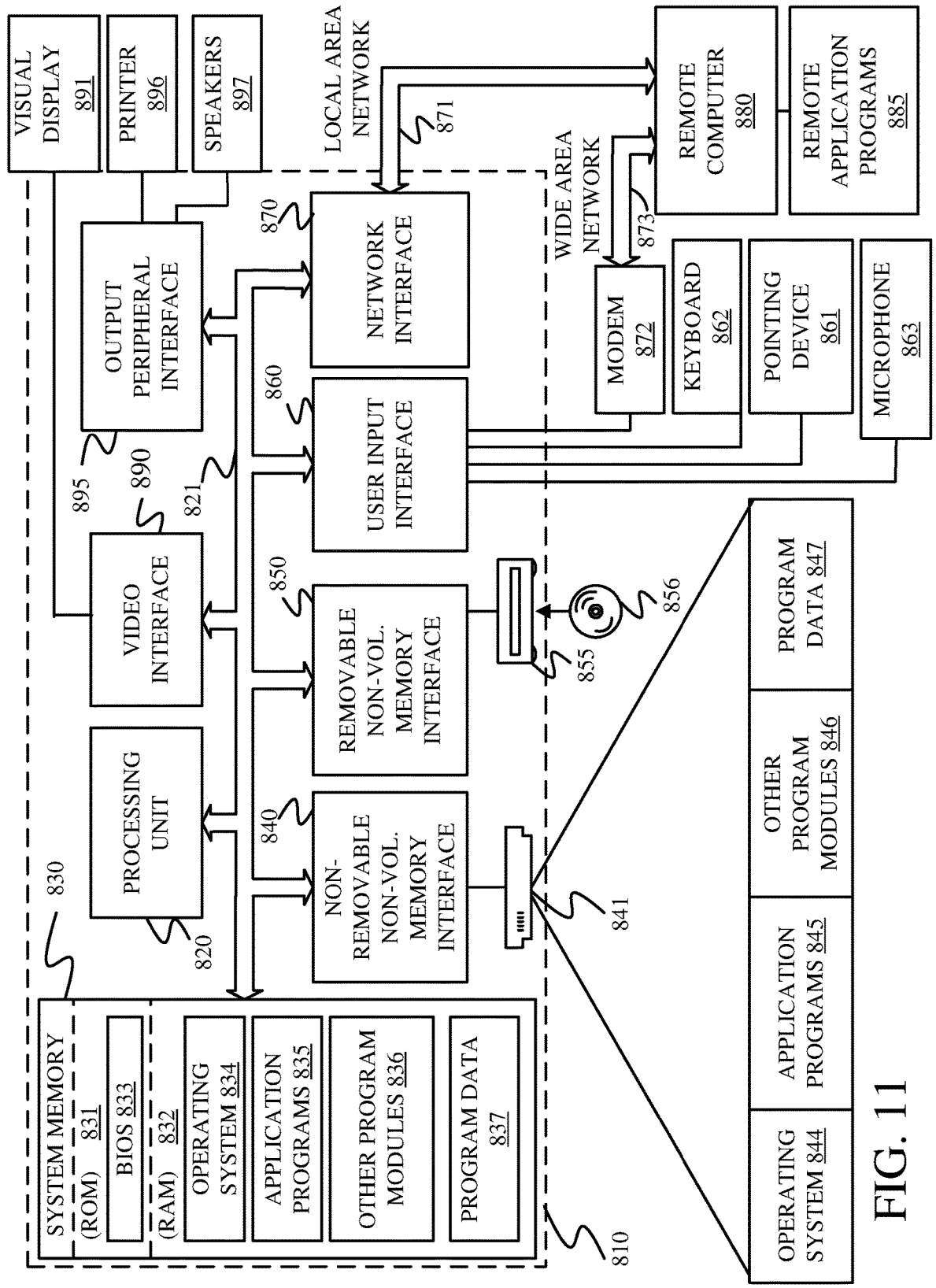
FIG. 11 is a block diagram showing one example of a computing environment that can be used in the architectures shown in the previous figures.

FIG. 11 is one example of a computing environment in which elements of FIG. 2, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball, levers, knobs, buttons, switches, pedals, steering wheel, or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880. The items can connect over a controller area network (CAN) with a suitable CAN bus.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a work cycle detection and control system, comprising:
    an angle detector that detects an angular position of an implement, operably coupled to a mobile machine, relative to a base of the mobile machine;
    a range detector that detects a degree range of rotation, about the base, in which the angular position of the implement is located;

work cycle logic that identifies a particular work cycle, from a plurality of different work cycles, that the mobile machine is performing, based on the degree range; and an action signal generator that generates an action signal, based on the particular work cycle.

Example 2 is the work cycle detection and control system of any or all previous examples, further comprising:

sensor interface logic configured to obtain angle sensor information from an angular position sensor associated with the mobile machine, wherein the angle position sensor is configured to detect the angular position of the implement, relative to the base of the mobile machine, based on the angle sensor information.

Example 3 is the work cycle detection and control system of any or all previous examples, wherein the range detector is configured to detect the degree range by identifying an upper degree limit and a lower degree limit that define angular limits of the detected degree range.

Example 4 is the work cycle detection and control system of any or all previous examples, wherein the range detector is configured to compare the upper and lower degree limits of the degree range to the angular position of the implement, relative to the base of the mobile machine.

Example 5 is the work cycle detection and control system of any or all previous examples, wherein the work cycle logic is configured to identify the particular work cycle by accessing a mapping that stores an association between each work cycle, in the plurality of different work cycles, and a corresponding one of a plurality of different degree ranges.

Example 6 is the work cycle detection and control system of any or all previous examples, and further comprising:

a user interface display, wherein the action signal generator is configured to generate an indication that visually identifies the particular work cycle on the user interface display.

Example 7 is the work cycle detection and control system of any or all previous examples, wherein the action signal generator is configured to generate instructions that control one or more controllable subsystems of the mobile machine, based on the action signal.

Example 8 is the work cycle detection and control system of any or all previous examples, wherein the angle detector is configured to detect a direction of rotation, of the implement, and wherein the range detector is configured to detect the detected degree range, based, at least in part, on the detected direction of rotation.

Example 9 is the work cycle detection and control system of any or all previous examples, further comprising:

operation characterization logic configured to receive an operation characteristics signal indicative of operation characteristics sensed on the mobile machine and generate an operation indication, indicative of an operation performed by the mobile machine, based on the particular work cycle identified and the operation characteristics.

Example 10 is the work cycle detection and control system of any or all previous examples wherein the operation characterization logic comprises:

a movement type detector that identifies a type of movement of the implement, based on the operation characteristics signal;

an attachment use detector that identifies a type of use of an attachment controllably attached to the mobile machine; and a time aggregator that aggregates an operating time of the mobile machine, in the degree range, when the work cycle detection logic identifies the particular work cycle based on the type of movement, the type of use of the attachment, and the aggregated operating time.

Example 11 is the work cycle detection and control system of any or all previous examples, wherein the action signal generator is configured to generate an indication of performance of the mobile machine, for the particular work cycle, based on the aggregated operating time.

Example 12 is a computer-implemented method, comprising:

detecting an angular position of an implement, operatively coupled to a mobile machine, relative to a base of the mobile machine;

detecting a particular work cycle, from a plurality of different work cycles, that the mobile machine is performing, based on the angular position of the implement; and generating an action signal, based on the particular work cycle.

Example 13 is the computer-implemented method of any or all previous examples, further comprising:

detecting a degree range of rotation, about the base, in which the angular position of the implement is located.

Example 14 is the computer-implemented method of any or all previous examples, wherein detecting the work cycle comprises:

accessing a mapping that stores an association between each work cycle, in the plurality of different work cycles, and a corresponding one of a plurality of different degree ranges of rotation about the base; and determining that the work cycle corresponds to the detected degree range, based on the mapping.

Example 15 is the computer-implemented method of any or all previous examples, wherein detecting the degree range comprises:

identifying an upper degree limit and a lower degree limit that define angular limits of the detected degree range.

Example 16 is the computer-implemented method of any or all previous examples, further comprising:

obtaining angle sensor information from an angular position sensor; and detecting the angular position of the implement, based on the angle sensor information.

Example 17 is the computer-implemented method of any or all previous examples, further comprising:

receiving an operator characteristic signal indicative of operator characteristics sensed on the mobile machine; and generating an operation indication, indicative of an operation performed by the mobile machine, based on the particular work cycle identified and the operator characteristics.

Example 18 is a work cycle detection and control system, comprising:

calibration logic that defines a degree range of rotation, about a base of a mobile machine, and identifies a particular work cycle, from a plurality of different work cycles, based on a calibration input;

a map generator that generates a mapped association between the degree range and the particular work cycle; and an action signal generator that generates an action signal, based on the mapped association.

Example 19 is the work cycle detection and control system of any or all previous examples, wherein the calibration logic comprises:

range definition logic configured to define the degree range by selecting a first degree limit and a second degree limit, wherein the first degree limit is selected based on a first calibration input and the second degree limit is selected based on a second calibration input.

Example 20 is the work cycle detection and control system of any or all previous examples, wherein the calibration logic comprises:

calibration input logic configured to detect user actuation of an implement, operably coupled to the mobile machine and generate the first calibration input and the second calibration input, based on the user actuation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A work cycle detection and control system, comprising:
    an angle detector configured to detect an angular position of an implement, operably coupled to a mobile machine, relative to a base of the mobile machine;
    a range detector configured to detect a degree range of rotation, about the base, in which the angular position of the implement is located;
    a movement type detector configured to identify a type of movement of the implement;
    an attachment use detector configured to identify a type of use of an attachment controllably attached to the mobile machine;
    an operation timer configured to aggregate an operating time of the mobile machine, in the degree range of rotation; and
    a processor and associated memory configured to provide:
    work cycle identification of a particular work cycle, from a plurality of different work cycles, that the mobile machine is performing, based on the degree range of rotation, the type of movement of the implement, the type of use of the attachment, and the aggregated operating time; and
    action signal generation to generate an action signal, based on the particular work cycle.

2. The work cycle detection and control system of claim 1, wherein the range detector is configured to detect the degree range of rotation by identifying an upper degree limit and a lower degree limit that define angular limits of the detected degree range of rotation.

3. The work cycle detection and control system of claim 2, wherein the range detector is configured to compare the upper and lower degree limits of the degree range of rotation to the angular position of the implement, relative to the base of the mobile machine.

4. The work cycle detection and control system of claim 1, wherein the processor is configured to identify the particular work cycle by accessing a mapping that stores an association between each work cycle, in the plurality of different work cycles, and a corresponding one of a plurality of different degree ranges of rotation.

5. The work cycle detection and control system of claim 2, wherein the association between each work cycle, in the plurality of work cycles, and the corresponding one of the plurality of different degree ranges of rotation is an operator-defined association.

6. The work cycle detection and control system of claim 1, and further comprising:
    a user interface display, wherein the action signal a visual signal that visually identifies the particular work cycle on the user interface display.

7. The work cycle detection and control system of claim 1, wherein the action signal includes instructions that control one or more controllable subsystems of the mobile machine, based on the action signal.

8. The work cycle detection and control system of claim 1, wherein the angle detector is configured to detect a direction of rotation, of the implement, and wherein the range detector is configured to detect the detected degree range of rotation, based, at least in part, on the detected direction of rotation.

9. The work cycle detection and control system of claim 1, wherein
    the processor is further configured to receive an operation characteristics signal indicative of operation characteristics sensed on the mobile machine and generate an operation indication, indicative of an operation performed by the mobile machine, based on the operation characteristics.

10. The work cycle detection and control system of claim 1, wherein the action signal includes an indication of performance of the mobile machine, for the particular work cycle, based on the aggregated operating time.

11. A computer-implemented method, comprising:
    detecting an angular position of an implement, operatively coupled to a mobile machine, relative to a base of the mobile machine;
    detecting a type of movement of the implement;
    detecting a type of use of an attachment controllably attached to the mobile machine;
    aggregating an operating time of the mobile machine in the degree range of rotation;
    detecting a particular work cycle, from a plurality of different work cycles, that the mobile machine is performing, based on the angular position of the implement, the type of movement of the implement, the type of use of the attachment, and the aggregated operating time; and
    generating an action signal, based on the particular work cycle.

12. The computer-implemented method of claim 11, further comprising:
    detecting a degree range of rotation, about the base, in which the angular position of the implement is located.

13. The computer-implemented method of claim 12, wherein detecting the work cycle comprises:
    accessing a mapping that stores an association between each work cycle, in the plurality of different work cycles, and a corresponding one of a plurality of different degree ranges of rotation about the base; and
    determining that the work cycle corresponds to the detected degree range of rotation, based on the mapping.

14. The computer-implemented method of claim 13, wherein the association between each work cycle, in the plurality of different work cycles, and the corresponding one of the plurality of different degree ranges of rotation about the base is an operator-defined association.

15. The computer-implemented method of claim 12, wherein detecting the degree range of rotation comprises:
    identifying an upper degree limit and a lower degree limit that define angular limits of the detected degree range of rotation.

16. The computer-implemented method of claim 11, further comprising:

obtaining angle sensor information from an angular position sensor; and detecting the angular position of the implement, based on the angle sensor information.

17. The computer-implemented method of claim 11, further comprising:

receiving an operation characteristics signal indicative of operation characteristics sensed on the mobile machine; and generating an operation indication, indicative of an operation performed by the mobile machine, based on the operation characteristics.

18. A work cycle detection and control system, comprising:

an angle detector configured to detect an angular position of an implement, operably coupled to a mobile machine, relative to a base of the mobile machine;

a range detector configured to detect a degree range of rotation, about the base, in which the angular position of the implement is located;

a processor and associated memory configured to:

obtain an operator-defined association that associates each work cycle of a plurality of different work cycles with a corresponding degree range of rotation; and identify a particular work cycle, of the plurality of different work cycles, that the mobile machine is performing, based on the detected degree range of rotation and the operator-defined association; and to provide action signal generation to generate an action signal, based on the particular work cycle.

* * * * *